(12) United States Patent
Lee et al.

(10) Patent No.: US 10,356,398 B2
(45) Date of Patent: Jul. 16, 2019

(54) METHOD FOR CAPTURING VIRTUAL SPACE AND ELECTRONIC DEVICE USING THE SAME

(71) Applicant: LG ELECTRONICS INC., Seoul (KR)

(72) Inventors: Hyunok Lee, Seoul (KR); Mihyun Park, Seoul (KR); Hongjo Shim, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 15/711,753

(22) Filed: Sep. 21, 2017

(65) Prior Publication Data

US 2018/0288391 A1    Oct. 4, 2018

(30) Foreign Application Priority Data

Apr. 4, 2017    (KR) .................. 10-2017-0043887

(51) Int. Cl.

| | |
|---|---|
| *G06F 3/033* | (2013.01) |
| *G06F 5/08* | (2006.01) |
| *H04N 9/47* | (2006.01) |
| *H04N 13/344* | (2018.01) |
| *G06F 3/0481* | (2013.01) |
| *G02B 27/01* | (2006.01) |
| *G06F 3/041* | (2006.01) |
| *G06T 19/00* | (2011.01) |
| *G06F 3/01* | (2006.01) |

(52) U.S. Cl.
CPC ......... *H04N 13/344* (2018.05); *G02B 27/017* (2013.01); *G02B 27/0172* (2013.01); *G06F 3/011* (2013.01); *G06F 3/041* (2013.01); *G06F 3/04817* (2013.01); *G06T 19/006* (2013.01); *G02B 2027/0138* (2013.01); *H04N 2213/001* (2013.01)

(58) Field of Classification Search
CPC .................. A63F 2300/8082; G06F 3/011
See application file for complete search history.

(56) References Cited

U.S. PATENT DOCUMENTS

| | | | |
|---|---|---|---|
| 2011/0225516 A1* | 9/2011 | Goldman ................ G06F 3/011 |
| | | | 715/757 |
| 2011/0248918 A1* | 10/2011 | Yoo ......................... G06F 3/011 |
| | | | 345/157 |
| 2014/0364228 A1* | 12/2014 | Rimon .................... A63F 13/12 |
| | | | 463/32 |
| 2015/0356788 A1* | 12/2015 | Abe ....................... A63F 13/428 |
| | | | 345/633 |
| 2016/0284136 A1* | 9/2016 | Johnston .............. G06T 19/006 |
| 2018/0001198 A1* | 1/2018 | Frappiea ............... A63F 13/213 |
| 2018/0107839 A1* | 4/2018 | Clement ............. G06F 21/6245 |
| 2018/0121069 A1* | 5/2018 | DiVerdi .............. G06F 3/04847 |
| 2018/0181196 A1* | 6/2018 | Lee ..................... H04N 5/23296 |

\* cited by examiner

*Primary Examiner* — Rebecca A Volentine

(74) *Attorney, Agent, or Firm* — Birch, Stewart, Kolasch & Birch, LLP

(57) ABSTRACT

An electronic device including a display; and a controller configured to display a playback screen of virtual reality content on the display, in response to a capture command while displaying the playback screen of the virtual reality content, display a virtual icon on the playback screen, and in response to a touch input applied to the virtual icon, capture an image of a virtual space of the virtual reality content based on a position of a user in the virtual space and corresponding to a touch level of the touch input.

16 Claims, 27 Drawing Sheets

METHOD FOR CAPTURING VIRTUAL SPACE AND ELECTRONIC DEVICE USING THE SAME

CROSS-REFERENCE TO RELATED APPLICATIONS

This application claims priority to Korean Patent Application No. 10-2017-0043887 filed on Apr. 4, 2017 in Korea, the entire contents of which is hereby incorporated by reference in its entirety.

BACKGROUND OF THE DISCLOSURE

1. Field of the Disclosure

The present disclosure relates to a method of capturing a virtual space in an electronic device and an electronic device using the same.

2. Background of the Disclosure

A head mounted display (HMD) type electronic device is worn on a head of a user to present an image directly in front of the user's eyes. Such an electronic device allows a user to enjoy image contents with a larger image than a TV or screen, and in particular, display a virtual space screen so a user can enjoy a virtual space experience.

Studies on allowing such an electronic device to be used in connection with another device such as a smart phone, a laptop computer, a navigation device, a slate PC, a tablet PC, an ultrabook, a wearable device or the like have been actively performed. In addition, the user would like to share or memorize experiences in a virtual world using the electronic device with other people. However, when merely capturing an image viewed by a user in a virtual world into a 2D or 3D image, there are limitations in expressing various views and emotions experienced by the user.

SUMMARY OF THE DISCLOSURE

Accordingly, an object of the present disclosure is to provide an electronic device for allow a user wearing an electronic device to generate a capture image containing various views and emotions experienced by a user in a virtual world without an additional external camera, and a method of capturing a virtual space using the same.

In order to solve the foregoing task, an electronic device according to an embodiment of the present disclosure may include a main body; a display unit configured to display a playback screen of virtual reality content; and a controller configured to generate a virtual icon for capturing a virtual space of the virtual reality content when a capture command is received while playing the virtual reality content, and control the display unit to display the generated virtual icon on the play screen. Here, when a touch input is applied to the virtual icon, the controller may recognize a user's position in the virtual space when a touch input is applied to the virtual icon, and generate a capture image of the virtual space corresponding to a touch level of the touch input based on the recognized user's position.

Moreover, in order to solve the foregoing task, there is provided a method of controlling an electronic device, and the method may include displaying a playback screen of virtual reality content; receiving a capture command while playing the virtual reality content; generating and displaying a virtual icon for capturing a virtual space of virtual reality content in response to the capture command; recognizing a user's position in the virtual space when a touch input is applied to the virtual icon; and generating a capture image of the virtual space corresponding to a touch level of the touch input based on the recognized user's position.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE PREFERRED EMBODIMENTS

Figure 1A:
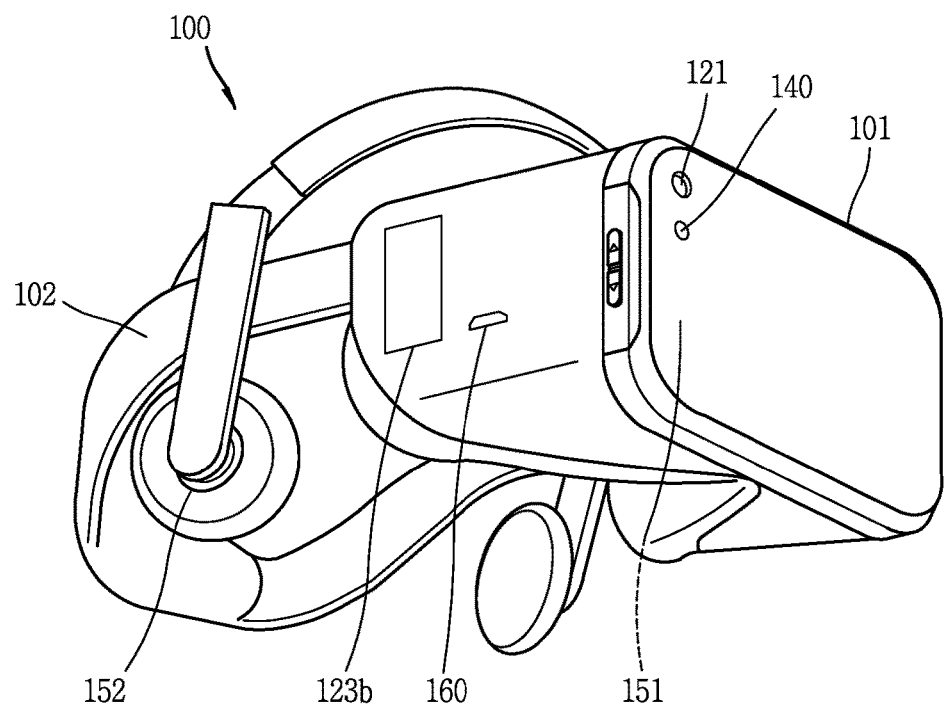
FIGS. 1A and 1B are conceptual views in which an electronic device associated with the present disclosure is seen from different directions.

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. The terms are used merely for the purpose to distinguish an element from the other element. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Electronic devices, mobile terminals or external terminals described herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to a stationary terminal such as a digital TV, a desktop computer and the like, excluding a case of being applicable only to the external devices, mobile terminals or external terminals.

Furthermore, the term "user" used in embodiments described below refers to a person using an electronic device or a device (e.g., a robot with artificial intelligence) using an electronic device. In addition, embodiments described below will describe technologies associated with the operations of an electronic device for capturing a virtual space during virtual experiences. Moreover, an electronic device described below may denote a wearable device formed to be wearable on a specific portion (e.g., a head portion) of a user's body.

Figure 1B:
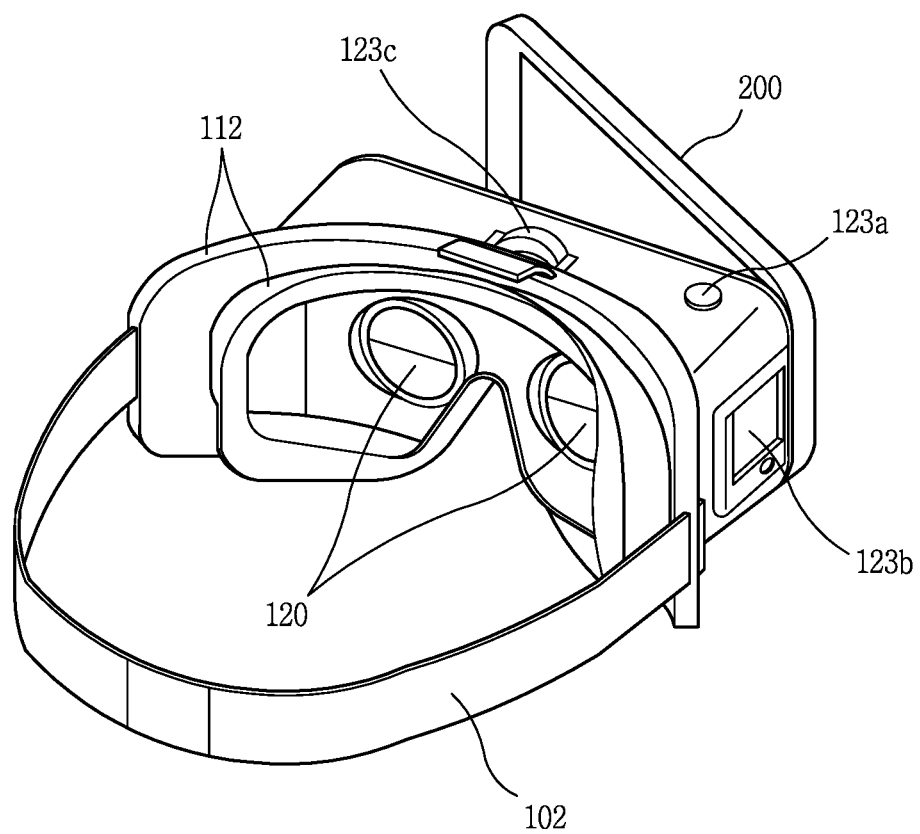

FIGS. 1A and 1B are conceptual views illustrating an example in which an electronic device associated with the present disclosure is seen from different directions. An electronic device 100 associated with the present disclosure may include at least one of a wireless communication unit, an input unit (e.g., user input units 123a, 123b, 123c, a microphone, etc.), a sensing unit 140, an output unit 150 (e.g., a display unit 151, an audio output unit 152), an interface unit 160, a memory, a controller, and a power supply unit. The constituent elements illustrated in FIGS. 1A and 1B may not be necessarily required to implement an electronic device, and the electronic device 100 described in the present specification may have a greater or less number of elements than those listed above.

Referring to FIG. 1A, the electronic device 100 associated with the present disclosure may be formed to be worn on a head portion (or head, face) of a user (human body), and may include a frame portion (a case, a housing, a cover, etc.) for the same. The frame portion may be formed of a flexible material to facilitate wearing. It is illustrated in the drawing that the frame portion includes a first frame 101 and a second frame 102 with different materials.

For example, the first frame 101 provides a space in which at least one of the constituent elements described in FIG. 1A can be disposed, and the second frame 102 supports or fixes the first frame 101 to be mounted on the head portion of the user (human body). The frame portion may be referred to as a main body (or an electronic device main body) or a body (or an electronic device body).

If a frame portion including the first frame 101 and the second frame 102 is regarded as one electronic device main body, then the main body of the electronic device associated with the present disclosure may be formed in various shapes. Specifically, the main body may include a plurality of surfaces constituting a preset angle. The plurality of surfaces denote surfaces located outside the main body of the electronic device 100. From this point of view, the plurality of surfaces may denote surfaces (an external surface, an outer surface, etc.) of the electronic device 100. The plurality of surfaces may respectively have a flat or bent shape.

In addition, a wearing portion 112 comes into contact with a portion of the user's body. For example, the wearing portion 112 may use a band formed of an elastic material so the frame portion is brought into close contact with the eyes of the user's face.

The main body (frame portion) is supported on the head portion to provide a space for mounting various components. As illustrated in the drawing, electronic components such as a camera 121, a display unit 151, user input units 123a, 123b, 123c, a controller 180, a sensing unit 140, an interface unit 160, and the like may be mounted on the first frame 101.

An electronic component such as an audio output unit 152 or the like may be mounted on the second frame 102. However, the present disclosure is not limited to this, and other constituent elements required for the electronic device may be disposed in various ways on the first frame 101 and the second frame 102 by the user's selection. In other words, the electronic device 100 described herein may have a greater or less number of constituent elements than those listed above.

The controller 180 of the electronic device controls various electronic components provided in the electronic device

100. The camera 121 may be provided in the display unit 151 of the main body. For example, the camera 121 may be disposed on one surface (for example, a front surface) of the main body of the electronic device 100. The camera 121 can also be disposed adjacent to at least one of the left and right eyes, and formed to capture (receive, enter) a front image. The camera 121 may also be disposed adjacent to the eyes to face a front side, and thus the camera 121 may acquire a scene viewed by a user as an image.

FIG. 1A illustrates one camera 121 is provided therein, but the present disclosure is not limited to this. That is, the camera 221 can be provided with a plural number to acquire a stereoscopic image.

The electronic device 100 may include a sensing unit 140. The sensing unit 140 may include a proximity sensor, an illumination sensor, a touch sensor, an acceleration sensor, a magnetic sensor, a gravity sensor (G-sensor), a gyroscope sensor, a gyroscope, a motion sensor, an RGB sensor, an infrared (IR) sensor, a finger scan sensor, an ultrasonic sensor, an optical sensor, a microphone (refer to microphone 122), a battery gauge, an environmental sensor (for example, a barometer, a hygrometer, a thermometer, a radiation detection sensor, a heat detection sensor, a gas detection sensor, etc.), a chemical sensor (for example, an electronic nose, a healthcare sensor, a biometric sensor, etc.).

For example, the controller 180 can detect the movement of the electronic device using a gyroscope sensor, a gravity sensor, a motion sensor, and the like included in the sensing unit 140. In another example, the controller 180 can detect a subject approaching the vicinity of the electronic device body using a proximity sensor, an illuminance sensor, a magnetic sensor, an infrared sensor, an ultrasonic sensor, an optical sensor, or the like included in the sensing unit 140.

The electronic device 100 may be provided with user input units 123*a*, 123*b*, 123*c* manipulated to receive a control command. The user input units 123*a*, 123*b*, 123*c* can employ any method if it is a tactile manner allowing the user to perform manipulation with a tactile feeling such as touch, push, wheel manipulation or the like. FIGS. 1A and 1B illustrate user input units 123*a*, 123*b*, 123*c* with a touch input method, a touch input method and a wheel manipulation method are all provided on the frame portion.

Furthermore, the electronic device 100 may include a microphone which processes input sound into electric audio data, and an audio output module 152 for outputting an audible sound. The audio output module 152 can transfer the audible sound in a general audio output manner or an osteoconductive manner. When the audio output unit 152 is implemented in the osteoconductive manner, the audio output unit 152 can be closely adhered onto the head portion when the user wears the electronic device 100 and vibrate the user's skull to transfer audible sounds.

The display unit 151 may be mounted on the frame unit to perform the role of displaying screen information (for example, image, video, etc.) in front of the user's eyes. The display unit 151 may be disposed to correspond to at least one of the left and right eyes to display screen information in front of the user's eyes when the user wears the electronic device 100. In other words, the display unit 151 may be formed to cover at least one of the user's left and right eyes (or to face at least one of the user's left and right eyes).

For example, the display unit 151 of an electronic device associated with the present disclosure can be located within the electronic device body. Specifically, the display unit 151 can be disposed within the electronic device, and disposed at a position facing the user's eyes when the user wears the electronic device on the user's head portion.

Furthermore, the electronic device 100 may include a lens unit 120 to allow the user to view screen information displayed on the display unit 151. In other words, the electronic device 100 associated with the present disclosure may be formed to transmit all screen information (or light) displayed on the display unit 151 to the user's eye balls (or field of view). For example, the lens unit 120 may be disposed to correspond to at least one of the user's both eyes (i.e., left and right eyes). Furthermore, the lens unit 120 may be disposed to lie between the user's eye balls and the display unit 151.

The lens unit 120 may have a varying viewing angle according to a distance between the user's eye balls and the display unit, and thus the position thereof may be formed to vary by the user's control. Furthermore, the lens unit 120 may be formed through a concave lens, a convex lens or a combination thereof.

Furthermore, the display unit 151 can project an image to the user's eyes using a prism. Also, the prism can be formed of a transparent material to allow the user to view the projected image and a general field of view (a range seen through the user's eyes) at the same time.

As described above, an image displayed through the display unit 151 can be seen to overlap with a general field of view. The electronic device 100 can thus provide augmented reality (AR) in which a virtual image overlaps with an image or background of reality using the characteristics of the display to show one image. In other words, the display unit 151 may be formed not to allow external light to pass therethrough to implement virtual reality (VR) or formed to allow external light to pass therethrough to implement augmented reality (AR).

Alternatively, the electronic device 100 can be functionally connected to a terminal device 200 to use the terminal device 200 as the display unit 151 of the electronic device 100. Hereinafter, an example in which the terminal device 200 is used as the display unit 151 has been described. When the terminal device 200 is used as the display unit 151 of the electronic device 100 as described above, the frame portion of the electronic device 100 can be configured to include a predetermined docking space for the terminal device 200 to be coupled thereto, and in this instance, they are coupled to each other so the terminal device 200 is accommodated into the docking space. When the terminal device 200 is used as the display unit 151 of the electronic device 100 as described above, the camera 121 and the sensing unit 140 may be replaced with a camera and a sensing unit provided in the terminal device 200 (refer to FIG. 1A).

In addition, when the electronic device 100 is electrically connected to the terminal device 200, the controller 180 of the electronic device may control the terminal device 200. When the terminal device 200 is mounted on the electronic device body 100 as described above, a configuration including the camera 121, the sensing unit 140, the display unit 151, the controller 180, and the like in the electronic device 100 may be replaced with a configuration including a camera, a sensing unit, a display unit, and a controller included in the terminal device 200.

Although the terminal device 200 is mounted on the main body of the electronic device 100 to be used as a display unit according to the present disclosure, the present disclosure is not limited thereto, and the present disclosure may of course include when the electronic device 100 is provided therein with the display unit 151 to reduce its weight.

The configuration of the electronic device 100 will be described in detail on the assumption that a configuration including the terminal device 200 is mounted on the electronic device main body 200, and the camera 121, the sensing unit 140, the display unit 151, the controller 180, and the like in the electronic device 100 is replaced with a configuration including the camera, the sensing unit, the display unit, and the controller included in the terminal device 200.

Figure 2:
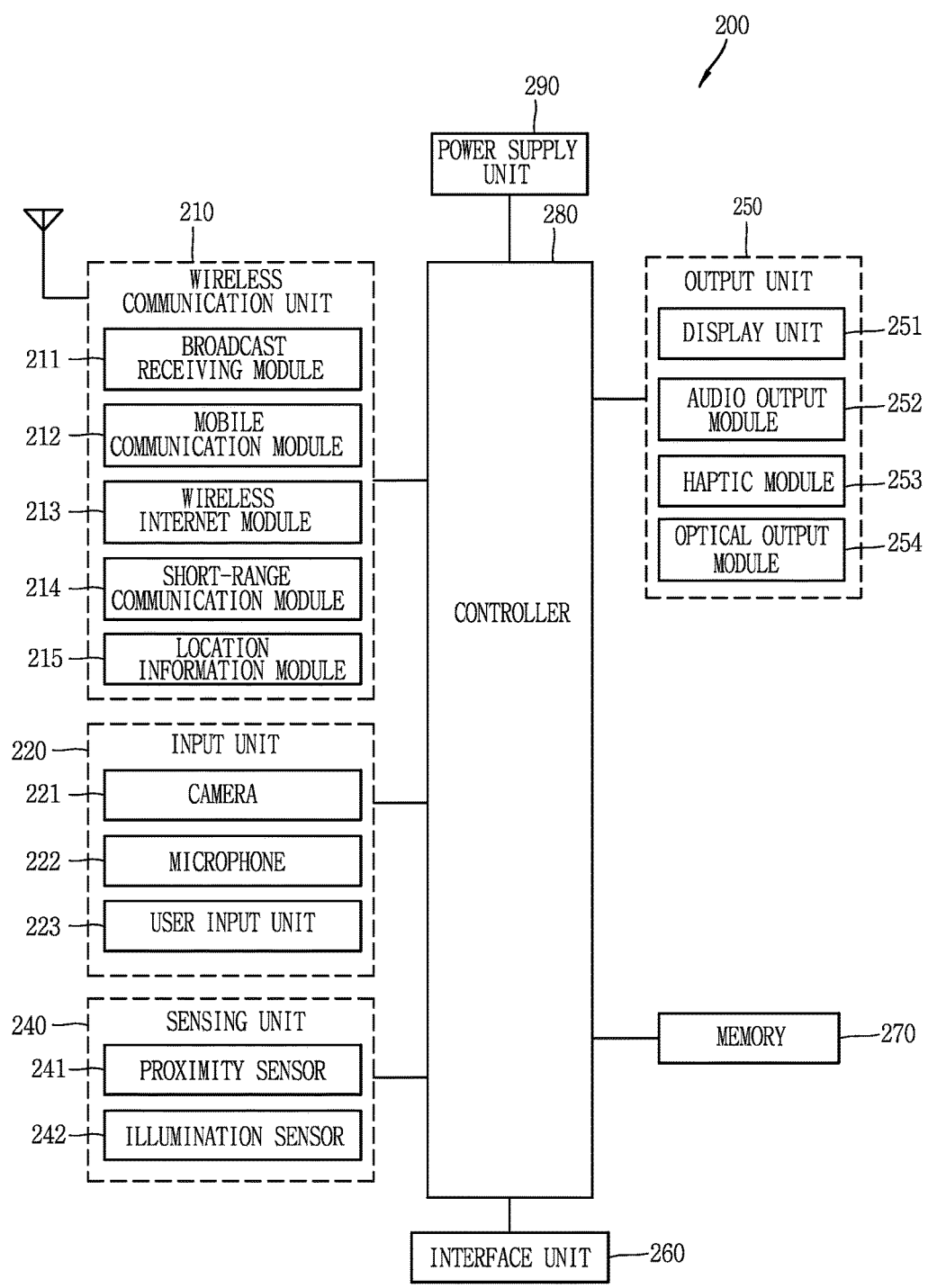
FIG. 2 is a block diagram illustrating the configuration of an electronic device associated with the present disclosure.
Figure 3A:
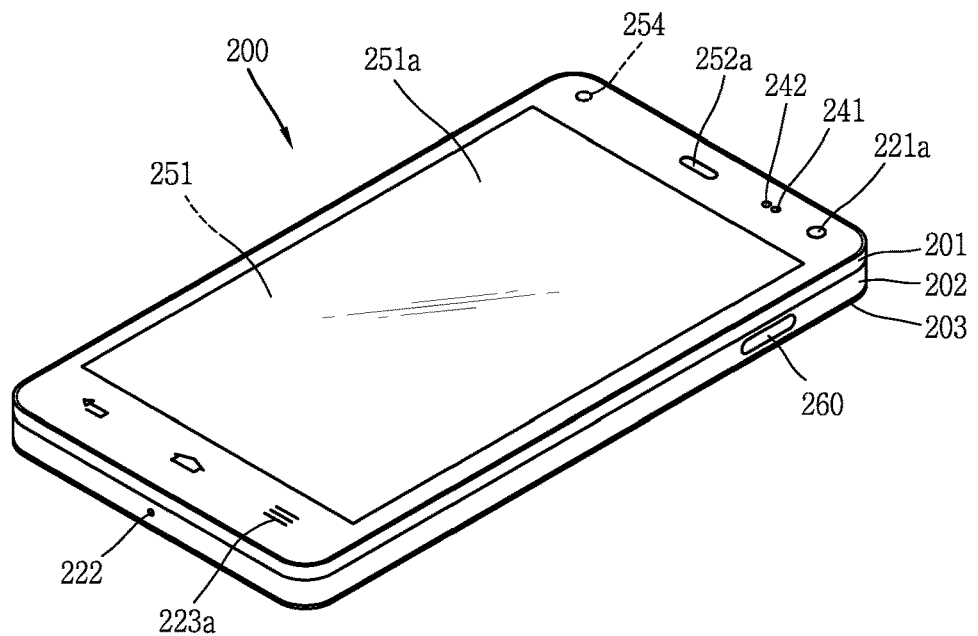
FIGS. 3A and 3B are conceptual diagrams in which a display configuration of an electronic device associated with the present disclosure is seen from different directions in a separate manner.
Figure 3B:
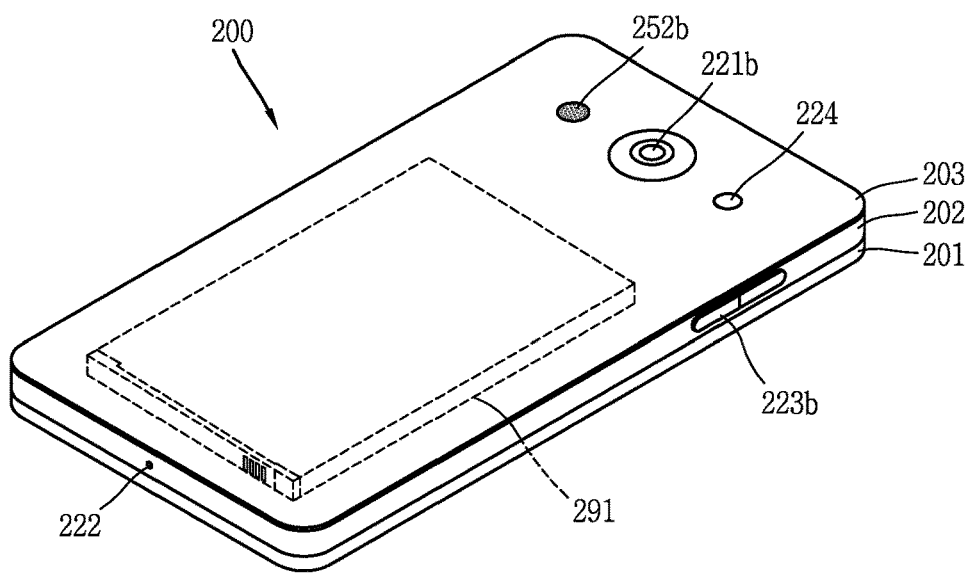

Next, FIG. 2 is a block diagram illustrating a terminal device associated with the present disclosure, and FIGS. 3A and 3B are conceptual diagrams in which a display configuration of an electronic device associated with the present disclosure is seen from different directions in a separate manner.

The terminal device 200 may include components, such as a wireless communication unit 210, an input unit 220, a sensing unit 240, an output unit 250, an interface unit 260, a memory 270, a controller 280, a power supply unit 290 and the like. FIG. 2 illustrates the mobile terminal having various components, but implementing all of the illustrated components is not a requirement. Greater or fewer components may alternatively be implemented.

In more detail, the wireless communication unit 210 of those constituent elements may include one or more modules which permit wireless communications between the terminal device 200 and a wireless communication system, between the terminal device 200 and another terminal device 200, or between the terminal device 200 and an external server. Furthermore, the wireless communication unit 210 may include one or more modules for connecting the terminal device 200 to one or more networks.

The wireless communication unit 210 may include at least one of a broadcast receiving module 211, a mobile communication module 212, a wireless Internet module 213, a short-range communication module 214, a location information module 215 and the like. The input unit 220 may include a camera 221 for inputting an image signal, a microphone 222 or an audio input module for inputting an audio signal, or a user input unit 223 (for example, a touch key, a push key (or a mechanical key), etc.) for allowing a user to input information. Audio data or image data collected by the input unit 220 may be analyzed and processed by a user's control command.

The sensing unit 240 may include at least one sensor which senses at least one of internal information of the mobile terminal, a surrounding environment of the mobile terminal and user information. For example, the sensing unit 240 may include a proximity sensor 241, an illumination sensor 242, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 221), a microphone 222, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 250 may be configured to output an audio signal, a video signal or a tactile signal. The output unit 250 may include a display unit 251, an audio output module 252, a haptic module 253, an optical output module 254 and the like. The display unit 251 may have an inter-layered structure or an integrated structure with a touch sensor so as to implement a touch screen. The touch screen may provide an output interface between the terminal device 200 and a user, as well as functioning as the user input unit 223 which provides an input interface between the terminal device 200 and the user.

The interface unit 260 may serve as an interface with various types of external devices connected with the terminal device 200. The interface unit 260, for example, may include wired or wireless headset ports, external power supply ports, wired or wireless data ports, memory card ports, ports for connecting a device having an identification module, audio input/output (I/O) ports, video I/O ports, earphone ports, or the like. The terminal device 200 may execute an appropriate control associated with a connected external device, in response to the external device being connected to the interface unit 260.

Furthermore, the memory 270 may store a plurality of application programs (or applications) executed in the terminal device 200, data for operations of the terminal device 200, instruction words, and the like. At least some of those application programs may be downloaded from an external server via wireless communication. Some others of those application programs may be installed within the terminal device 200 at the time of being shipped for basic functions of the terminal device 200 (for example, receiving a call, placing a call, receiving a message, sending a message, etc.). Further, the application programs may be stored in the memory 270, installed in the terminal device 200, and executed by the controller 280 to perform an operation (or a function) of the terminal device 200.

The controller 280 may typically control an overall operation of the terminal device 200 in addition to the operations associated with the application programs. The controller 280 may provide or process information or functions appropriate for a user by processing signals, data, information and the like, which are input or output by the aforementioned components, or activating the application programs stored in the memory 270.

Furthermore, the controller 280 can control at least part of the components illustrated in FIG. 2, in order to drive the application programs stored in the memory 270. In addition, the controller 280 can drive the application programs by combining at least two of the components included in the terminal device 200 for operation.

The power supply unit 290 can receive external power or internal power and supply appropriate power required for operating respective elements and components included in the terminal device 200 under the control of the controller 280. The power supply unit 290 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 270.

First, the wireless communication unit 210 will be described. The broadcast receiving module 211 of the wireless communication unit 210 may receive a broadcast signal and/or broadcast associated information from an external broadcast managing entity via a broadcast channel. The broadcast channel may include a satellite channel and a terrestrial channel. At least two broadcast receiving modules 211 may be provided in the terminal device 200 to simultaneously receive at least two broadcast channels or switch the broadcast channels.

The mobile communication module 212 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

The wireless signals may include audio call signal, video (telephony) call signal, or various formats of data according to transmission/reception of text/multimedia messages. The wireless Internet module 213 denotes a module for wireless Internet access. This module may be internally or externally coupled to the terminal device 200. The wireless Internet module 213 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 213 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 213 which performs the wireless Internet access via the mobile communication network may be understood as a type of the mobile communication module 212.

The short-range communication module 214 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 214 may support wireless communications between the terminal device 200 and a wireless communication system, between the terminal device 200 and another terminal device 200, or between the mobile terminal and a network where another terminal device 200 (or an external server) is located, via wireless personal area networks.

Here, the another terminal device 200 may be a wearable device, for example, a smart watch, smart glasses or a head mounted display (HMD), which can exchange data with the terminal device 200 (or to like data with the terminal device 200). The short-range communication module 214 may sense (recognize) a wearable device, which can communicate with the mobile terminal), near the terminal device 200. In addition, when the sensed wearable device is a device which is authenticated to communicate with the terminal device 200 according to the present disclosure, the controller 280 may transmit at least part of data processed in the terminal device 200 to the wearable device via the short-range communication module 214. Hence, a user of the wearable device may use the data processed in the terminal device 200 on the wearable device. For example, when a call is received in the terminal device 200, the user can answer the call using the wearable device. Also, when a message is received in the terminal device 200, the user can check the received message using the wearable device.

The location information module 215 denotes a module for detecting or calculating a position of the mobile terminal. An example of the location information module 215 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 215 may perform any function of the other modules of the wireless communication unit 210 to obtain data on the location of the mobile terminal. As a module used to acquire the location (or current location) of the mobile terminal, the location information module 215 is not limited to a module for directly calculating or acquiring the location of the mobile terminal.

Next, the input unit 220 may be configured to provide an audio or video signal (or information) input to the mobile terminal or information input by a user to the mobile terminal. For the input of the audio information, the terminal device 200 may include one or a plurality of cameras 221. The camera 221 may process image frames of still pictures or video obtained by image sensors in a video call mode or a capture mode. The processed image frames may be displayed on the display unit 251. Further, the plurality of cameras 221 disposed in the terminal device 200 may be arranged in a matrix configuration. By use of the cameras 221 having the matrix configuration, a plurality of image information having various angles or focal points may be input into the terminal device 200. Also, the plurality of cameras 221 may be arranged in a stereoscopic structure to acquire a left image and a right image for implementing a stereoscopic image.

The microphone 222 may process an external audio signal into electric audio data. The processed audio data may be utilized in various manners according to a function being executed in the terminal device 200 (or an application program being executed). Further, the microphone 222 may include assorted noise removing algorithms to remove noise generated in the course of receiving the external audio signal.

The user input unit 223 may receive information input by a user. When information is input through the user input unit 223, the controller 280 may control an operation of the terminal device 200 to correspond to the input information. The user input unit 223 may include a mechanical input element (or a mechanical key, for example, a button located on a front/rear surface or a side surface of the terminal device 200, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

Also, the sensing unit 240 may sense at least one of internal information of the mobile terminal, surrounding environment information of the mobile terminal and user information, and generate a sensing signal corresponding to it. The controller 280 may control an operation of the terminal device 200 or execute data processing, a function or an operation associated with an application program installed in the mobile terminal based on the sensing signal. Hereinafter, description will be given in more detail of representative sensors of various sensors which may be included in the sensing unit 240.

First, a proximity sensor 241 refers to a sensor to sense presence or absence of an object approaching to a surface to be sensed, or an object disposed near a surface to be sensed, by using an electromagnetic field or infrared rays without a mechanical contact. The proximity sensor 241 may be arranged at an inner region of the mobile terminal covered by the touch screen, or near the touch screen. The proximity sensor 241 may have a longer lifespan and a more enhanced utility than a contact sensor.

The proximity sensor 241, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 241 may sense proximity of a pointer to the touch screen by changes of an electromagnetic field, which is responsive to an approach of an object with conductivity. In this instance, the touch screen (touch sensor) may be categorized into a proximity sensor.

For the sake of brief explanation, a state that the pointer is positioned to be proximate onto the touch screen without contact will be referred to as "proximity touch," whereas a state that the pointer substantially comes in contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 241 may sense proximity touch, and proximity touch patterns (e.g., distance, direction, speed, time, position, moving state, etc.). Further, the controller 280 may process data (or information) corresponding to the proximity touches and the proximity touch patterns sensed by the proximity sensor 241, and output visual information corresponding to the process data on the touch screen. In addition, the controller 280 may control the terminal device 200 to execute different operations or process different data (or information) according to whether a touch with respect to the same point on the touch screen is either a proximity touch or a contact touch.

A touch sensor may sense a touch (or touch input) applied onto the touch screen (or the display unit 251) using at least one of various types of touch methods, such as a resistive type, a capacitive type, an infrared type, a magnetic field type, and the like. As one example, the touch sensor may be configured to convert changes of pressure applied to a specific part of the display unit 251 or a capacitance occurring from a specific part of the display unit 251, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 280. Accordingly, the controller 280 may sense which region of the display unit 251 has been touched. Here, the touch controller may be a component separate from the controller 280 or the controller 280 itself.

Further, the controller 280 may execute a different control or the same control according to a type of an object which touches the touch screen (or a touch key provided in addition to the touch screen). Whether to execute the different control or the same control according to the object which gives a touch input may be decided based on a current operating state of the terminal device 200 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information associated with a sensing object by using ultrasonic waves. The controller 280 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 221 constructing the input unit 220 may be a type of camera sensor. The camera sensor may include at least one of a photo sensor and a laser sensor. The camera 221 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 251 may output information processed in the terminal device 200. For example, the display unit 251 may display execution screen information of an application program driven in the terminal device 200 or user interface (UI) and graphic user interface (GUI) information in response to the execution screen information.

Furthermore, the display unit 251 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output unit 252 may output audio data received from the wireless communication unit 210 or stored in the memory 260 in a call signal reception mode, a call mode, a record mode, a voice recognition mode, a broadcast reception mode, and the like. Also, the audio output unit 252 may also provide audible output signals related to a particular function (e.g., a call signal reception sound, a message reception sound, etc.) performed by the terminal device 200. The audio output unit 252 may include a receiver, a speaker, a buzzer or the like.

A haptic module 253 may generate various tactile effects that can be felt by a user. A representative example of tactile effect generated by the haptic module 253 may be vibration. The intensity, pattern and the like of vibration generated by the haptic module 253 may be controlled by a user's selection or the settings of the controller. For example, the haptic module 253 may output different vibrations in a combined manner or in a sequential manner.

Besides vibration, the haptic module 253 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 253 may be implemented to allow the user to feel a tactile effect through a muscle sensation such as the user's fingers or arm, as well as transferring the tactile effect through a direct contact. Two or more haptic modules 253 may be provided according to the configuration of the terminal device 200.

An optical output unit 254 may output a signal for indicating an event generation using light of a light source. Examples of events generated in the terminal device 200 may include a message reception, a call signal reception, a missed call, an alarm, a schedule notice, an email reception, an information reception through an application, and the like.

A signal output by the optical output unit 254 may be implemented so the mobile terminal emits monochromatic light or light with a plurality of colors. The signal output may be terminated as the mobile terminal senses a user's event checking.

The interface unit 260 may serve as an interface with every external device connected with the terminal device 200. For example, the interface unit 260 may receive data transmitted from an external device, receive power to transfer to each element within the terminal device 200, or transmit internal data of the terminal device 200 to an external device. For example, the interface unit 260 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal device 200 and may include a user identity module (UIM), a subscriber identity module (SIM), a universal subscriber identity module (USIM), and the like. In addition, the device having the identification module (referred to as "identifying device', hereinafter) may take the form of a smart card. Accordingly, the identifying device may be connected with the terminal 200 via the interface unit 260.

When the terminal device 200 is connected with an external cradle, the interface unit 260 may serve as a passage to allow power from the cradle to be supplied to the terminal device 200 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 270 may store programs for operations of the controller 280 and temporarily store input/output data (for example, phonebook, messages, still images, videos, etc.). The memory 270 may store data related to various patterns of vibrations and audio which are output in response to touch inputs on the touch screen.

The memory 270 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal device 200 may be operated in relation to a web storage device that performs the storage function of the memory 270 over the Internet.

As aforementioned, the controller 280 may typically control the general operations of the terminal device 200. For example, the controller 280 may set or release a lock state for restricting a user from inputting a control command with respect to applications when a state of the mobile terminal meets a preset condition.

Furthermore, the controller 280 may also perform controlling and processing associated with voice calls, data communications, video calls, and the like, or perform pattern recognition processing to recognize a handwriting input or a picture drawing input performed on the touch screen as characters or images, respectively. In addition, the controller 280 may control one or combination of those components in order to implement various exemplary embodiment disclosed herein on the terminal device 200.

The power supply unit 290 may receive external power or internal power and supply appropriate power required for operating respective elements and components included in the terminal device 200 under the control of the controller 280. The power supply unit 290 may include a battery. The battery may be an embedded battery which is rechargeable or be detachably coupled to the terminal body for charging.

Furthermore, the power supply unit 290 may include a connection port. The connection port may be configured as one example of the interface unit 260 to which an external (re)charger for supplying power to recharge the battery is electrically connected.

As another example, the power supply unit 290 may be configured to recharge the battery in a wireless manner without use of the connection port. Here, the power supply unit 290 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 3A and 3B, the terminal device 200 disclosed herein may be provided with a bar-type terminal body. However, the present disclosure is not limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

The terminal device 200 may include a case (casing, housing, cover, etc.) forming the appearance of the terminal. In this embodiment, the case may be divided into a front case 201 and a rear case 202. Various electronic components may be incorporated into a space formed between the front case 201 and the rear case 202. At least one middle case may be additionally disposed between the front case 201 and the rear case 202

A display unit 251 may be disposed on a front surface of the terminal body to output information. As illustrated, a window 251a of the display unit 251 may be mounted to the front case 201 so as to form the front surface of the terminal body together with the front case 201.

In some cases, electronic components may also be mounted to the rear case 202. Examples of those electronic components mounted to the rear case 202 may include a detachable battery, an identification module, a memory card and the like. Here, a rear cover 203 for covering the electronic components mounted may be detachably coupled to the rear case 202. Therefore, when the rear cover 203 is detached from the rear case 202, the electronic components mounted to the rear case 202 may be externally exposed.

As illustrated, when the rear cover 203 is coupled to the rear case 202, a side surface of the rear case 202 may be partially exposed. In some cases, upon the coupling, the rear case 202 may also be completely shielded by the rear cover 203. Further, the rear cover 203 may include an opening for externally exposing a camera 221b or an audio output module 252b. The cases 201, 202, 203 may be formed by injection-molding synthetic resin or may be formed of a metal, for example, stainless steel (STS), titanium (Ti), or the like.

Unlike the example which the plurality of cases form an inner space for accommodating such various components, the terminal device 200 may be configured such that one case forms the inner space. In this example, a terminal device 200 having a uni-body formed so synthetic resin or metal extends from a side surface to a rear surface may also be implemented.

Further, the terminal device 200 may include a waterproofing unit for preventing an introduction of water into the terminal body. For example, the waterproofing unit may include a waterproofing member which is located between the window 251a and the front case 201, between the front case 201 and the rear case 202, or between the rear case 202 and the rear cover 203, to hermetically seal an inner space when those cases are coupled.

The terminal device 200 may include a display unit 251, first and second audio output modules 252a, 252b, a proximity sensor 241, an illumination sensor 252, an optical output module 254, first and second cameras 221a, 221b, first and second manipulation units 223a, 223b, a microphone 222, an interface unit 260 and the like.

Hereinafter, description will be given of an exemplary terminal device 200 that the display unit 251, the first audio output module 252a, the proximity sensor 241, the illumination sensor 242, the optical output module 254, the first camera 221a and the first manipulation unit 223a are disposed on the front surface of the terminal body, the second manipulation unit 223b, the microphone 222 and the interface unit 260 are disposed on a side surface of the terminal body, and the second audio output module 252b and the second camera 221b are disposed on a rear surface of the terminal body, with reference to FIGS. 3A and 3B.

Here, those components may not be limited to the arrangement, but be excluded or arranged on another surface if necessary. For example, the first manipulation unit 223a may not be disposed on the front surface of the terminal body, and the second audio output module 252b may be disposed on the side surface other than the rear surface of the terminal body.

The display unit 251 may output information processed in the terminal device 200. For example, the display unit 251 may display execution screen information of an application program driven in the terminal device 200 or user interface (UI) and graphic user interface (GUI) information in response to the execution screen information.

The display unit 251 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 251 may be implemented in two or more in number according to a configured aspect of the terminal device 200. For instance, a plurality of the display units 251 may be arranged on one surface to be spaced apart from or integrated with each other, or may be arranged on different surfaces.

The display unit 251 may include a touch sensor which senses a touch onto the display unit so as to receive a control command in a touching manner. When a touch is input to the display unit 251, the touch sensor may be configured to sense this touch and the controller 280 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 251a and a display on a rear surface of the window 251a or patterned directly on the rear surface of the window 251a. Or, the touch sensor may be integrally formed with the display. For example, the touch sensor may be disposed on a substrate of the display or within the display.

The display unit 251 may form a touch screen together with the touch sensor. Here, the touch screen may serve as the user input unit 223 (see FIG. 2A). Therefore, the touch screen may replace at least some of functions of the first manipulation unit 223a.

The first audio output module 252a may be implemented in the form of a receiver for transferring voice sounds to the user's ear or a loud speaker for outputting various alarm sounds or multimedia reproduction sounds.

The window 251a of the display unit 251 may include a sound hole for emitting sounds generated from the first audio output module 252a. Here, the present disclosure may not be limited to this. It may also be configured such that the sounds are released along an assembly gap between the structural bodies (for example, a gap between the window 251a and the front case 201). In this instance, a hole independently formed to output audio sounds may not be seen or hidden in terms of appearance, thereby further simplifying the appearance of the terminal device 200.

The optical output module 254 may output light for indicating an event generation. Examples of the event generated in the terminal device 200 may include a message reception, a call signal reception, a missed call, an alarm, a schedule notice, an email reception, information reception through an application, and the like. When a user's event checking is sensed, the controller may control the optical output unit 254 to stop the output of the light.

The first camera 221a may process video frames such as still or moving images obtained by the image sensor in a video call mode or a capture mode. The processed video frames may be displayed on the display unit 251 or stored in the memory 270.

The first and second manipulation units 223a, 223b are examples of the user input unit 223, which may be manipulated by a user to input a command for controlling the operation of the terminal device 200. The first and second manipulation units 223a, 223b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 223a is a touch key, but the present disclosure is not limited to this. For example, the first manipulation unit 223a may be configured with a mechanical key, or a combination of a touch key and a push key.

The content received by the first and second manipulation units 223a, 223b may be set in various ways. For example, the first manipulation unit 223a may be used by the user to input a command such as menu, home key, cancel, search, or the like, and the second manipulation unit 223b may be used by the user to input a command, such as controlling a volume level being output from the first or second audio output module 252a or 252b, switching into a touch recognition mode of the display unit 251, or the like.

Further, as another example of the user input unit 223, a rear input unit may be disposed on the rear surface of the terminal body. The rear input unit may be manipulated by a user to input a command for controlling an operation of the terminal device 200. The content input may be set in various ways. For example, the rear input unit may be used by the user to input a command, such as power on/off, start, end, scroll or the like, controlling a volume level being output from the first or second audio output module 252a or 252b, switching into a touch recognition mode of the display unit 251, or the like. The rear input unit may be implemented into a form allowing a touch input, a push input or a combination thereof.

The rear input unit may be disposed to overlap the display unit 251 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 223a located on the front surface of the terminal body. Accordingly, when the first manipulation unit 223a is not disposed on the front surface of the terminal body, the display unit 251 may be implemented to have a larger screen.

Further, the terminal device 200 may include a finger scan sensor which scans a user's fingerprint. The controller may use fingerprint information sensed by the finger scan sensor as an authentication means. The finger scan sensor may be installed in the display unit 251 or the user input unit 223.

The microphone 222 may be formed to receive the user's voice, other sounds, and the like. The microphone 222 may be provided at a plurality of places, and configured to receive stereo sounds.

The interface unit 260 may serve as a path allowing the terminal device 200 to exchange data with external devices. For example, the interface unit 260 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal device 200. The interface unit 260 may be implemented in the form of a socket for accommodating an external card, such as Subscriber Identification Module (SIM), User Identity Module (UIM), or a memory card for information storage.

The second camera 221b may be further mounted to the rear surface of the terminal body. The second camera 221b may have an image capturing direction, which is substantially opposite to the direction of the first camera unit 221a.

The second camera 221b may include a plurality of lenses arranged along at least one line. The plurality of lenses may also be arranged in a matrix configuration. The cameras may be referred to as an "array camera." When the second camera 221b is implemented as the array camera, images may be captured in various manners using the plurality of lenses and images with better qualities may be obtained. A flash 224 may be disposed adjacent to the second camera 221b. When an image of a subject is captured with the camera 221b, the flash 224 may illuminate the subject.

The second audio output module 252b may further be disposed on the terminal body. The second audio output module 252b may implement stereophonic sound functions in conjunction with the first audio output module 252a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 211 (refer to FIG. 2) may be retractable into the terminal body. Alternatively, an antenna may be formed in a form of film to be attached onto an inner surface of the rear cover 203 or a case including a conductive material may serve as an antenna.

A power supply unit 290 (refer to FIG. 2) for supplying power to the terminal device 200 may be disposed on the terminal body. The power supply unit 290 may include a batter 291 which is mounted in the terminal body or detachably coupled to an outside of the terminal body.

The battery 291 may receive power via a power source cable connected to the interface unit 260. Also, the battery 291 may be (re)chargeable in a wireless manner using a wireless charger. The wireless charging may be implemented by magnetic induction or electromagnetic resonance.

Further, the drawing illustrates that the rear cover 203 is coupled to the rear case 202 for shielding the battery 291, so as to prevent separation of the battery 291 and protect the battery 291 from an external impact or foreign materials. When the battery 291 is detachable from the terminal body, the rear case 203 may be detachably coupled to the rear case 202.

An accessory for protecting an appearance or assisting or extending the functions of the terminal device 200 may further be provided on the terminal device 200. As one example of the accessory, a cover or pouch for covering or accommodating at least one surface of the terminal device 200 may be provided. The cover or pouch may cooperate with the display unit 251 to extend the function of the terminal device 200. Another example of the accessory may be a touch pen for assisting or extending a touch input onto a touch screen.

Figure 4A:
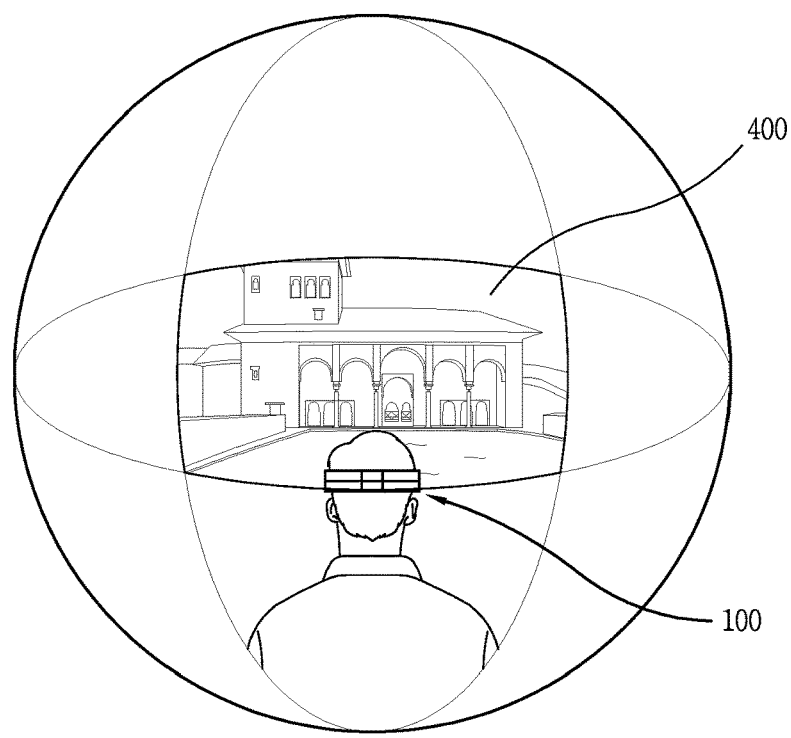
FIGS. 4A and 4B are views illustrating a configuration in which a playback screen of virtual reality content is displayed on an electronic device associated with the present disclosure.
Figure 4B:
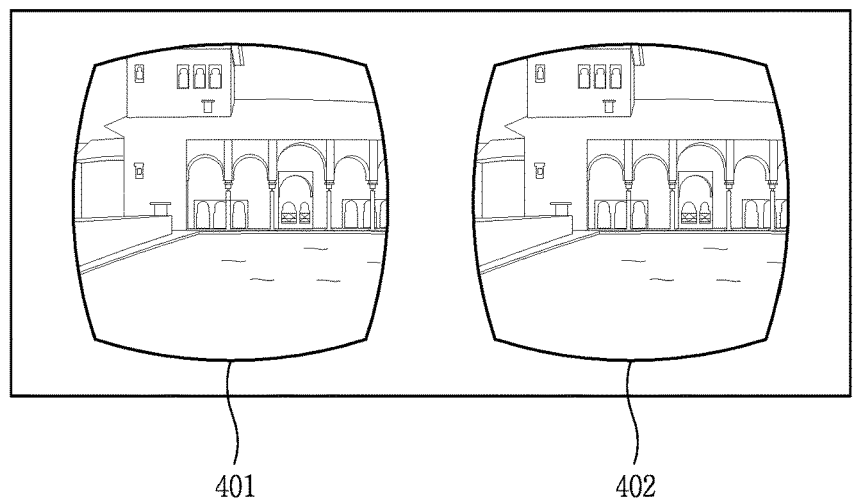

Hereinafter, FIGS. 4A and 4B are views illustrating a configuration in which a playback screen of virtual reality content is displayed on the electronic device 100 associated with the present disclosure. The electronic device 100 according to the present disclosure or the terminal device 200 mounted on the electronic device 100 can provide virtual reality content through the display unit 151. The virtual reality content exhibits virtual reality that is different from actual reality. In other words, as illustrated in FIG. 4A, the virtual reality content provides a three-dimensional spatial image 400 for a user wearing the electronic device 100 to be mistaken as if he or she is in a specific area or another space while preventing actual reality from being seen. Accordingly, the user can feel as if he or she is in a virtual space. Such a virtual space can be achieved by providing a three-dimensional spatial image 400 through a left eye image 401 and a right eye image 402, respectively, corresponding to the user's binocular parallax, as illustrated in FIG. 4B.

Such a virtual space or experience in the virtual space may only be felt by a user who wears the electronic device 100. Further, sometimes a user who wears the electronic device 100 wants to share a virtual space or experience experienced by the user with another person or to remind the user himself or herself. In this instance, even if a virtual space is captured, it is difficult to transmit the sense of space and experience experienced by the user in the virtual space since it is stored as a two-dimensional image. Otherwise, it is difficult to know specifically what the user experienced in the virtual space by capturing only a first person perspective that the user himself sees.

As a result, when a capture command is received while a playback screen of virtual reality content is displayed on the display unit 151, the electronic device 100 according to an embodiment of the present disclosure displays a virtual icon for capturing a virtual space of the virtual reality content on the playback screen. Then, when a touch input is applied to the displayed virtual icon, the controller 180 of the electronic device 100 recognizes the user's position in the virtual space. At this time, the user's position corresponds to the position of the user's virtual avatar experiencing a virtual world. Furthermore, the controller 180 can generate a capture image of the virtual space to correspond to a touch level of the touch input applied to the virtual icon based on the recognized user's position.

Figure 5:
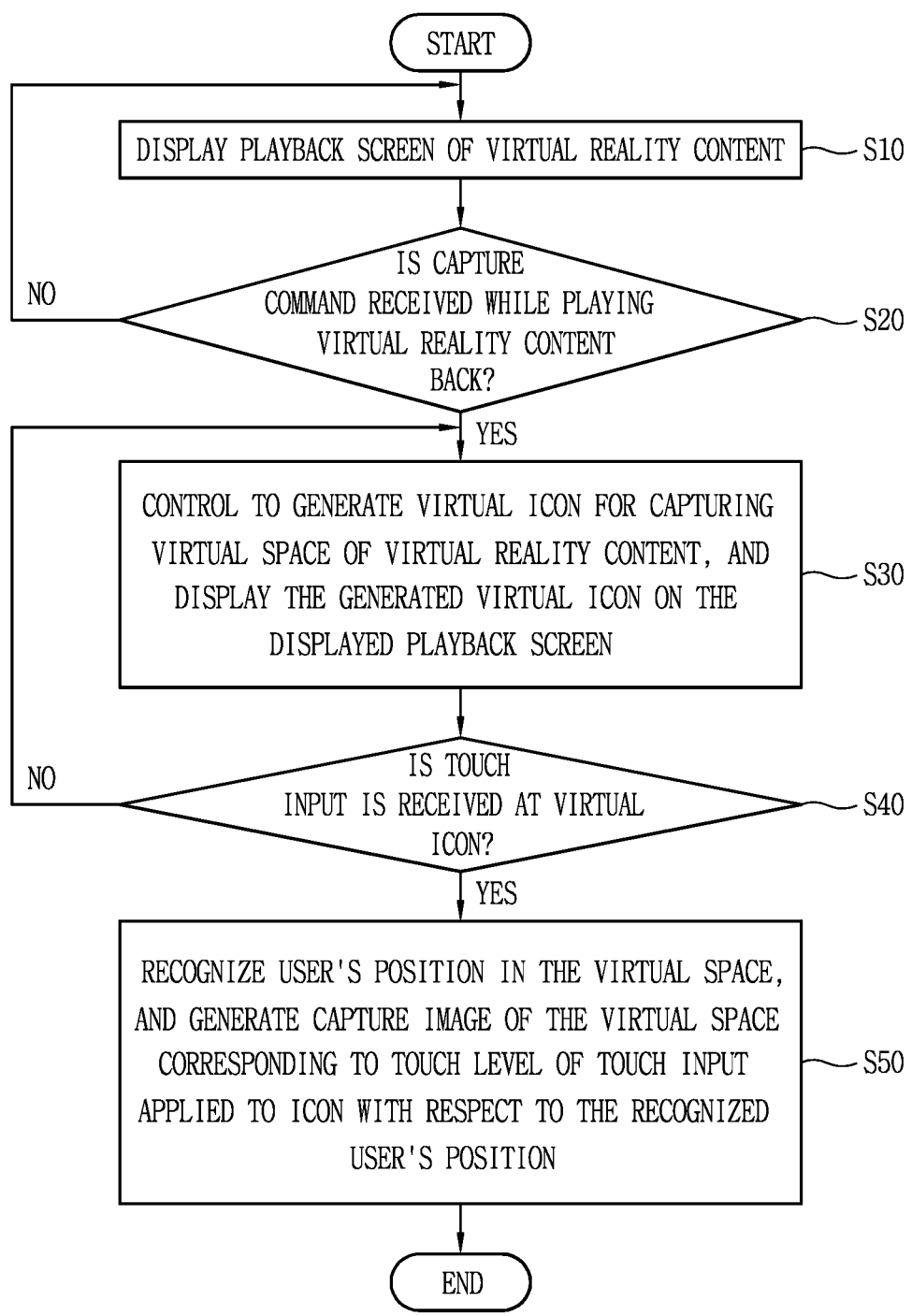
FIG. 5 is a flow chart illustrating a method of generating a capture image of a virtual space using a virtual icon in an electronic device associated with the present disclosure.

Hereinafter, FIG. 5 is a flow chart illustrating a method of generating a capture image of a virtual space using a virtual icon in the electronic device associated with the present disclosure. Referring to FIG. 5, a playback screen of virtual reality content is displayed through the display unit 151 of the electronic device 100 (S10). Here, the virtual reality content may be one that is stored in the electronic device 100 or stored in the terminal device 200 mounted on the electronic device 100. There is no limitation on the type of the virtual reality content. For example, it may include a home screen or a specific application displayed on the display unit 151 of the electronic device 100, namely, all cases where all types of programs that can be driven on the electronic device 100, for example, web browser, video playback, schedule management, call, game, music, document work, message, finance, e-book, traffic information, and the like are displayed in a virtual space as a three-dimensional spatial image.

When a capture command is generated while the virtual reality content is being played back, the controller 180 can recognize the capture command (S20). Such a capture command may be generated in response to various input methods or specific event occurrences. Specifically, it includes various input methods such as a specific hand gesture, a voice command, a user's gaze or a push input to a physical key, a touch input, and the like. Alternatively, when there is a specific interval/time/motion change or the like in the virtual reality content, it may be considered that an event corresponding to a trigger signal of the capture command has occurred. When such a capture command is generated, the controller 180 can determine a time point at which the capture command is generated or a time point preceding a predetermined time period/interval from a time point at which the capture command is generated. In the latter case, for example, three-dimensional images that have been stored for about one minute prior to generating the capture command can be extracted from the buffer to generate one capture image or a plurality of capture images selected based on a motion change of an object within a three-dimensional image.

Figure 6A:
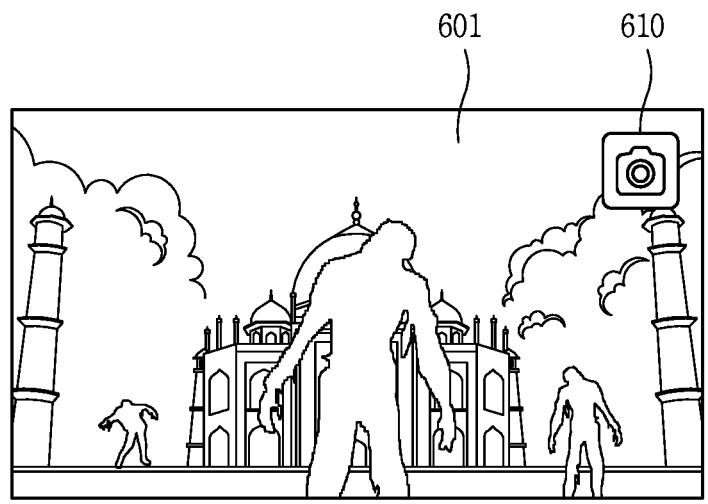
FIGS. 6A, 6B, 7A, 7B and 7C are exemplary conceptual views associated with setting a range of a virtual space to be captured according to a touch level applied to a virtual icon in an electronic device associated with the present disclosure.
Figure 6B:
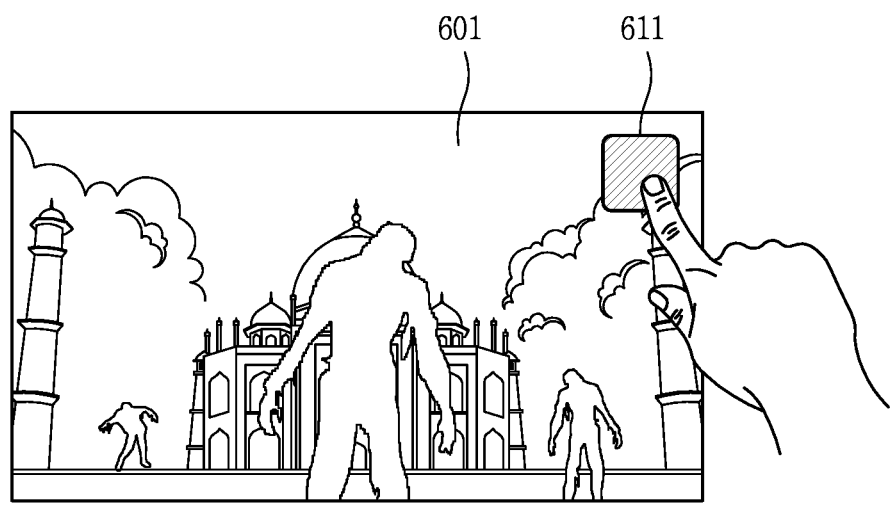

Next, in response to the capture command, the controller 180 can generate a virtual icon for capturing a virtual space of the virtual reality content, and control the display unit 151 to display the generated virtual icon on the playback screen (S30). Here, the virtual icon may be displayed in a shape corresponding to the virtual reality content or displayed in a predetermined region (e.g., an upper right side or a lower right side of the three-dimensional spatial image). For example, as illustrated in FIG. 6A, a virtual icon in a shape of a photographing icon image 610 may appear on the three-dimensional image 601.

In addition, the controller 180 can recognize a touch input applied to the virtual icon (S40). The touch input to the virtual icon may be performed through the user's virtual avatar (e.g., a character who experiences a virtual world). Alternatively, it may be performed by allowing the user to placing a finger at a point where the virtual icon is actually located in a three-dimensional image. In addition, the controller 180 can recognize a touch level of the touch input (e.g., a touch intensity, a touch time, a number of touches, etc.) applied to the virtual icon.

In response to the touch input applied to the virtual icon as described above, the controller 180 can obtain the user's current position in the virtual space being experienced (or a current position of the user's virtual avatar). Such a current position of the user can be expressed in a three-dimensional coordinate in the virtual space.

Furthermore, the controller 180 can generate a capture image of the virtual space corresponding to the touch level of the touch input to the virtual icon with respect to the recognized the user's position (S50). In other words, the virtual space in all directions including the left, right, upper, and lower sides may be captured as one three-dimensional image with the three-dimensional coordinate of the user in the virtual space as an original point. In other words, a capture image may be generated using a space that is wider than the three-dimensional image currently seen by the user, the user can be expressed closer to the sense of space and experience that the user felt in a virtual world.

In addition, a virtual world seen from the user viewpoint can be checked as a 360-degree image through the generated capture image. Moreover, as will be described in more detail below, it is also be possible to check a virtual world including the user at a third person perspective.

Hereinafter, various examples associated with setting a range of a virtual space to be captured in a different manner according to a touch level of a touch applied to a virtual icon generated in response to a capture command will be described with reference to FIGS. 6A, 6B, 7A, 7B, and 7C. As illustrated in FIG. 6A, in response to the foregoing capture command, a virtual icon 610 having a photographing icon image shape can be displayed in a region of a three-dimensional virtual image 601 corresponding to virtual reality content, for example, an upper right side thereof. The virtual icon 610 can appear as a two-dimensional image or a three-dimensional image on the three-dimensional virtual image 601 being played back.

In addition, when a touch level of the touch input applied to the virtual icon 610 varies, the controller 180 can reduce or extend a range of the virtual space to be captured. For example, as a pressure of the touch input applied to the virtual icon 610 increases or a touch time of the touch input increases, a range of the virtual space to be captured can be further extended. On the contrary, when a pressure of the touch input applied to the virtual icon 610 slightly varies or a number of touches increases, a range of the virtual space to be captured can be reduced to be close to the current position of the user.

Furthermore, according to an example, a graphic object 611 corresponding to a range of the virtual space to be captured may be displayed on the virtual icon 610. Here, the graphic object may include all various types of images that determine visual characteristics such as the shape, color, size, and the like of the virtual icon 610 as well as an image (e.g., color, specific object, etc.), a text or the like displayed on the virtual icon 610. In this instance, when a range of the virtual space to be captured varies, an image of the graphic object displayed on the virtual icon 610 is changed to correspond to the changed capture range.

Specifically, when an input is applied to the virtual icon 610 through the user's virtual avatar, the user's actual hand or the like, an image can be changed according to a touch level of the touch input. For example, when the virtual icon 610 is displayed as a two-dimensional image, an image such as color, text (e.g., 2D or 3D display), transparency, and the like of the virtual icon 610 can be changed according to a touch level of the touch input, thereby allowing the user to visually recognize a change in the range of the space to be captured. In another example, when the virtual icon 610 is displayed as a three-dimensional image, the 3D depth sense of the virtual icon may be changed or a visual change such as a three-dimensional movement such as rotation or the like may be performed according to a touch level of the touch input, thereby visually checking a change in the range of the space to be captured according to the touch level.

In addition, according to an example, the controller 180 is operated to generate a capture image at the time when the touch input applied to the virtual icon 610 is released. In other words, the controller 180 can determine a range of the virtual space to be captured around the user's position at the time when the touch input applied to the virtual icon is released. Accordingly, when a capture image is generated at the time when the touch input is applied to the virtual icon, it is possible to prevent a time gap from occurring between a three-dimensional spatial image close to the user's current position and a three-dimensional spatial image far from the user's current position within a range of the space to be captured.

Figure 7A:
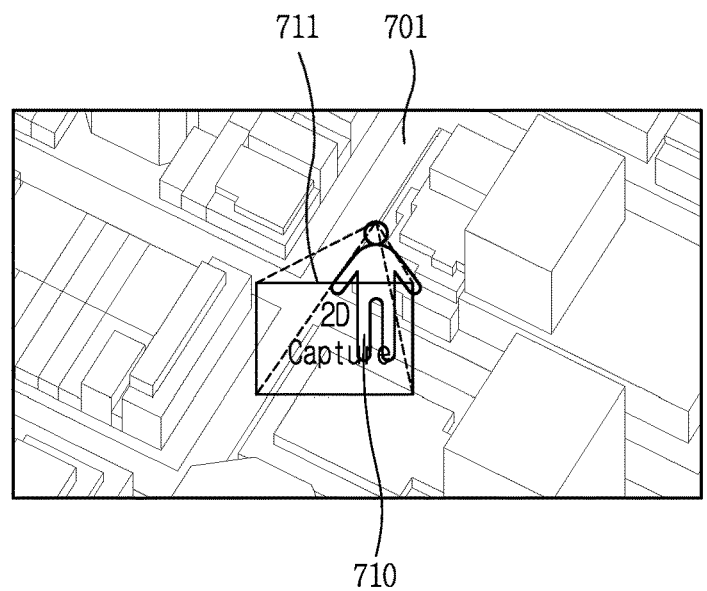

FIG. 7A is an example of when a touch less than a predetermined pressure is applied to and then released from the virtual icon 610, wherein a three-dimensional virtual image 701 is captured as a two-dimensional image seen from the user position 710. Further, information for notifying the capture of a three-dimensional image, for example, "2D" text, can be displayed on the virtual icon 610 when the touch input is released.

Figure 7B:
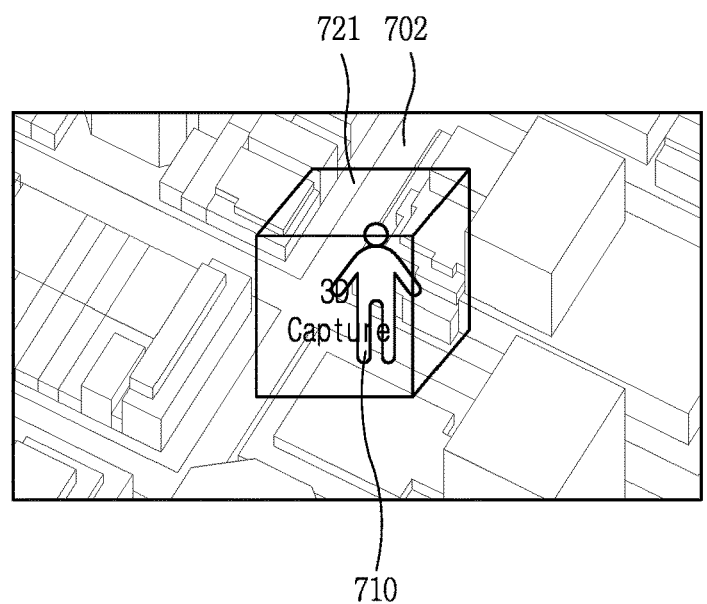
Figure 7C:
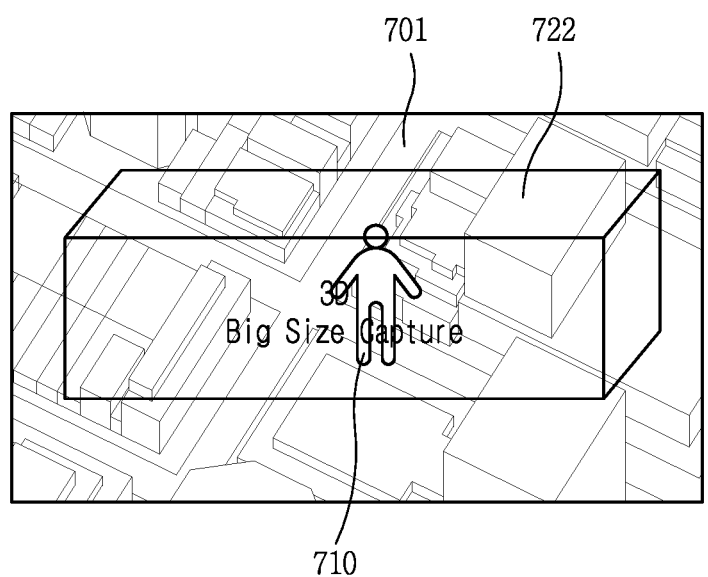

Furthermore, FIGS. 7B and 7C illustrate an example of when a touch exceeding a predetermined pressure is applied to the virtual icon 610, and it is seen that a three-dimensional virtual space around the user location 710 is captured while the display of the virtual icon 610 changes from "2D" to "3D", for example. As the pressure of the touch input increases, a range of the capture space range 621 illustrated in FIG. 7B can be extended as that of the capture space 621 illustrated in FIG. 7C. As described above, the user can recognize the extent of a spatial range to be captured through a visual change of the graphic object displayed on the virtual icon 610, and the expansion/reduction of the range.

Alternatively, according to another example, as a touch time of the touch input applied to the virtual icon 610 increases, a range of the virtual space to be captured is extended. Further, since the captured image is stored in a 3D format, a capture image corresponding to FIG. 7C is provided as a screen zoomed out from a capture image corresponding to FIG. 7B.

When a capture image is generated but there is no additional input to the virtual icon 610 within a predetermined time, the display of the virtual icon 610 may disappear. In addition, when a plurality of capture images are generated as an additional input is applied to the virtual icon 610, information (e.g., a number of captured images) indicating that a plurality of capture images are generated in the virtual icon 610 or another region of the playback screen may be displayed.

The captured image can be stored in the memory 170 or 270 in the form of a three-dimensional image. In this regard, FIGS. 8A, 8B, 8C and 8D illustrate various examples associated with a method of displaying and controlling the stored capture image of a virtual space.

Figure 8A:
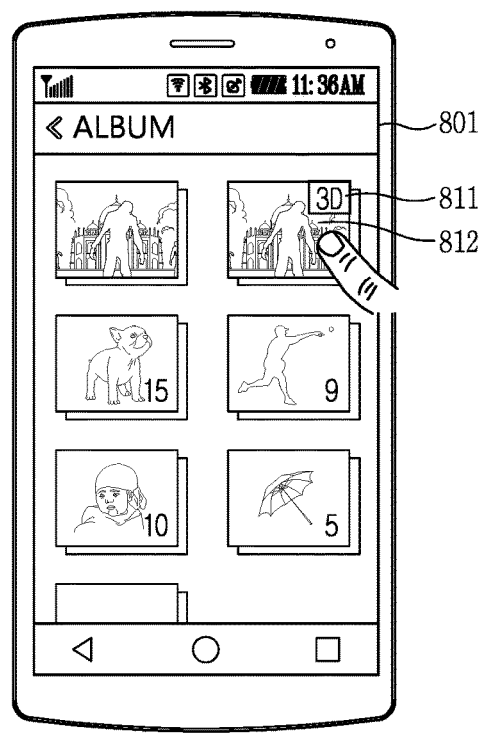
FIGS. 8A, 8B, 8C and 8D are conceptual views illustrating a method of displaying and controlling a capture image of a virtual space in an electronic device associated with the present disclosure.

First, it is seen a folder 812 in which a capture image is stored through the display unit 151 of the electronic device 100 or through a thumbnail list 801 of images corresponding to the execution of a gallery application installed in the terminal device 200 connected to the electronic device 100 as illustrated in FIG. 8A. In the folder 812 in which a capture image is stored, a graphic object 811 indicating that the classified images are three-dimensional images, for example, a text "3D', may be displayed. When the folder 812 in which the capture image is stored is selected, three-dimensional capture images are displayed in the order in which they are stored.

Figure 8B:
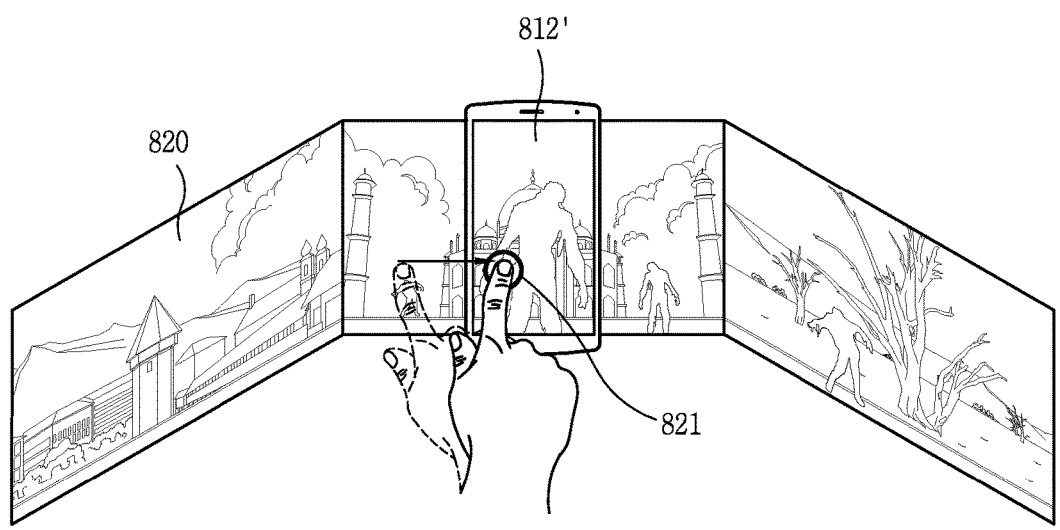

The capture image 812' displayed on the display unit 251 corresponds to a viewpoint and a view angle initially viewed from the user position in a virtual space. It corresponds to position A in FIG. 8D. Furthermore, since the displayed capture image 812' is a three-dimensional image, a three-dimensional image having a different view angle (e.g., 820) can be displayed according to a touch gesture 821 of up, down, left, right or the like as illustrated in FIG. 8B.

In addition, a viewpoint of the capture image continuously maintains a viewpoint at which the user wearing the electronic device 100 views in a virtual space, namely, a first-person perspective. Specifically, while the capture image is being displayed, the controller 180 can control the display unit to change and display a view angle of the capture image while maintaining the first-person perspective of the capture image based on a touch gesture applied to the display unit, for example, a drag touch input such as up, down, left and right. Accordingly, the user or a third person can check a virtual world seen from the user position in a virtual space as in a 360-degree camera, while moving his or her gaze over the entire 360-degree range. It corresponds to position B in FIG. 8D.

In addition, in case a conventional 2D image, when a touch gesture in a left or right direction is applied to the display unit 251, a next/previous image stored therein is displayed, but herein, different view angle images of the same 3D capture image are displayed. Consequently, a virtual button (e.g., "←" and/or "→") for moving to a next/previous 3D capture image can be provided in one region (e.g., an upper right end) of a currently displayed capture image 812' in FIG. 8B. Furthermore, four direction keys can be provided to guide a view angle that is viewable on the currently displayed capture image 812'. In addition, each direction key of the four direction keys can be displayed as a different image depending on the extent of viewable angle of view. Here, the different image denotes a different visual effect such as length, thickness, color, blinking or the like of the direction key.

In addition, according to an example, the controller can control the display unit to display a capture image in which a viewpoint is changed while the capture image is zoomed out based on a second touch gesture, for example, a pinch-in gesture, applied to the display unit while the capture image is displayed on the display unit.

Figure 8C:
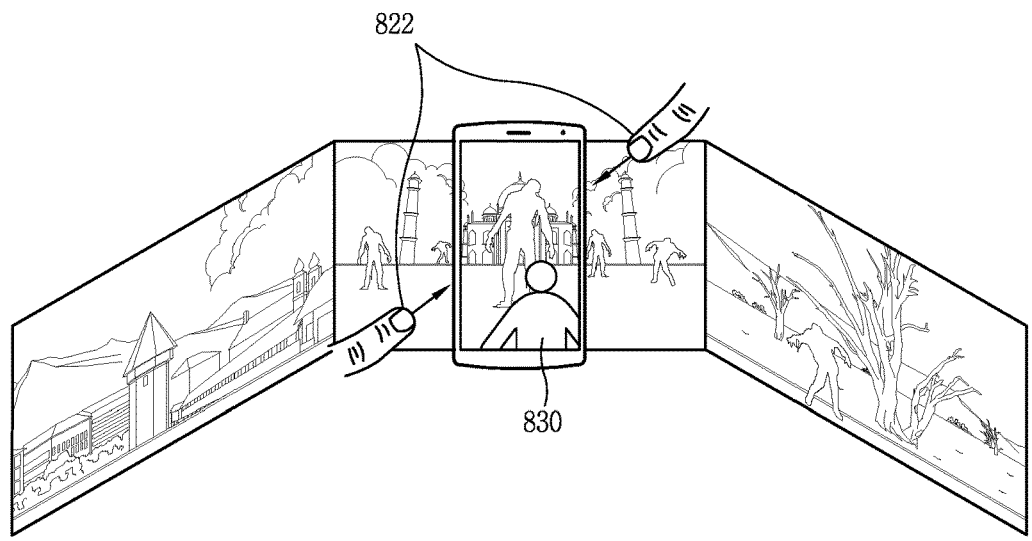
Figure 8D:
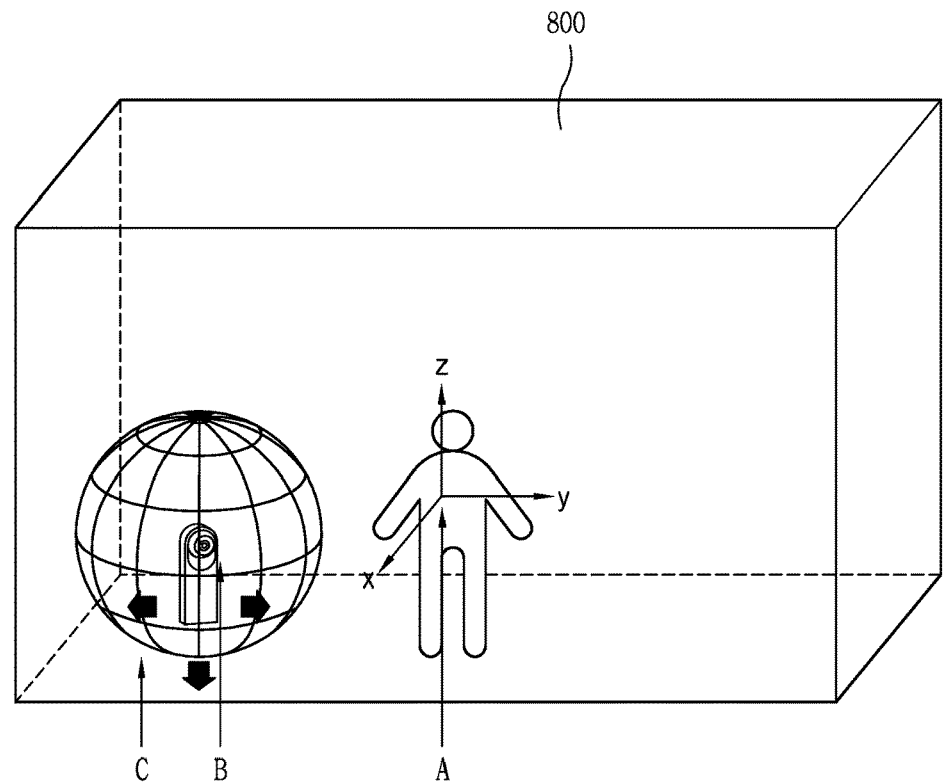

Specifically, as illustrated in FIG. 8C, when a pinch-in gesture 822 is additionally applied to the display unit when a capture image from a first-person perspective cannot be zoomed out any more, the capture image from a first-person perspective is changed to a capture image from a second-person or third-person perspective. As a result, as the user or a third person moves backward beyond the user position in a virtual space as an observation camera, a virtual avatar 830 of himself or herself appears on the capture image. It corresponds to looking at the user and the virtual space at position C in FIG. 8D.

In addition, a viewpoint modified capture image can be zoomed out using the pinch-in gesture 822 until a boundary line of the captured virtual space is reached. In this instance, a size of the virtual avatar 830 is also reduced in response to the screen zoom-out. Conversely, when a pinch-out gesture is successively performed while a capture image from a second-person or third-person perspective is displayed, the capture image may be switched back to the first-person perspective as the capture image is gradually zoomed in. As a result, the user's virtual avatar naturally disappears.

Further, when a playback command is received while the capture image 812' is displayed, the capture image can rotate in a preset direction so the entire view angle seen from the first-person perspective can be checked. In addition, the rotation direction and the rotation speed can be varied based on a specific object (e.g., a moving object, an interactive object) included in the capture image. For example, the rotation speed can be reduced at a view angle where a specific object exists or increased at a view angle where the specific object does not exist.

In addition, according to an example, when a viewpoint of the capture image is changed from a first-person perspective to a second-person perspective or a third-person perspective, a pop-up window asking whether or not to display the virtual avatar may be displayed. Accordingly, the user can reconsider whether or not to change the viewpoint of the capture image.

In the above, examples associated with setting a virtual range to be captured based on a touch level of a touch input applied to a virtual icon have been described. Hereinafter, examples associated with setting a range of the virtual space to be captured in connection with the extent of the user's movement in a virtual space will be described.

First, FIGS. 9A, 9B, 9C, 10A, 10B and 10C are exemplary conceptual views illustrating a method of generating and displaying a capture image based on a user's movement range in a virtual space. A user wearing the electronic device 100 may move in a virtual space according to the type of virtual reality content. In addition, it is difficult for an impression experienced by the user in a virtual world to be transmitted to the other person only by showing a space viewed by the user in a virtual space in 2D or 3D. Accordingly, it is preferable that a capture image is generated so other persons can feel various emotions (e.g., thrill, trembling, height sense, pace, surprise, fear) experienced by the user while moving in a virtual space.

Thus, according to the present disclosure, while the user's own avatar moving in a virtual space is displayed on the capture image, a range that has been moved by the user can be set to a range of the virtual space to be captured. In other words, the capture image can be generated to express the user's mobility and activity in a virtual space.

Specifically, when a touch input is applied to a virtual icon, the controller 180 of the electronic device 100 can detect the movement information of a virtual avatar moving in a virtual space. Furthermore, a range of the virtual space to be captured can be set based on the detected movement information. Specifically, the controller 180 can set a range of the virtual space to be captured in a different manner in consideration of the extent of movement of the virtual avatar in a virtual space, for example, a moving direction and speed thereof, from a time point when the touch input is applied to the virtual icon to a moment when the touch input is released.

Furthermore, a range of the virtual space to be captured may not be set around the center of a virtual space range in which the user's position recognized at the time when the touch input applied to the virtual icon is released is captured. In other words, the position of the virtual avatar does not become the center of the virtual space to be captured. For this purpose, the controller 180 can determine that the position of the virtual avatar at the time when the touch input applied to the virtual icon is released corresponds to the detected movement information.

Figure 9A:
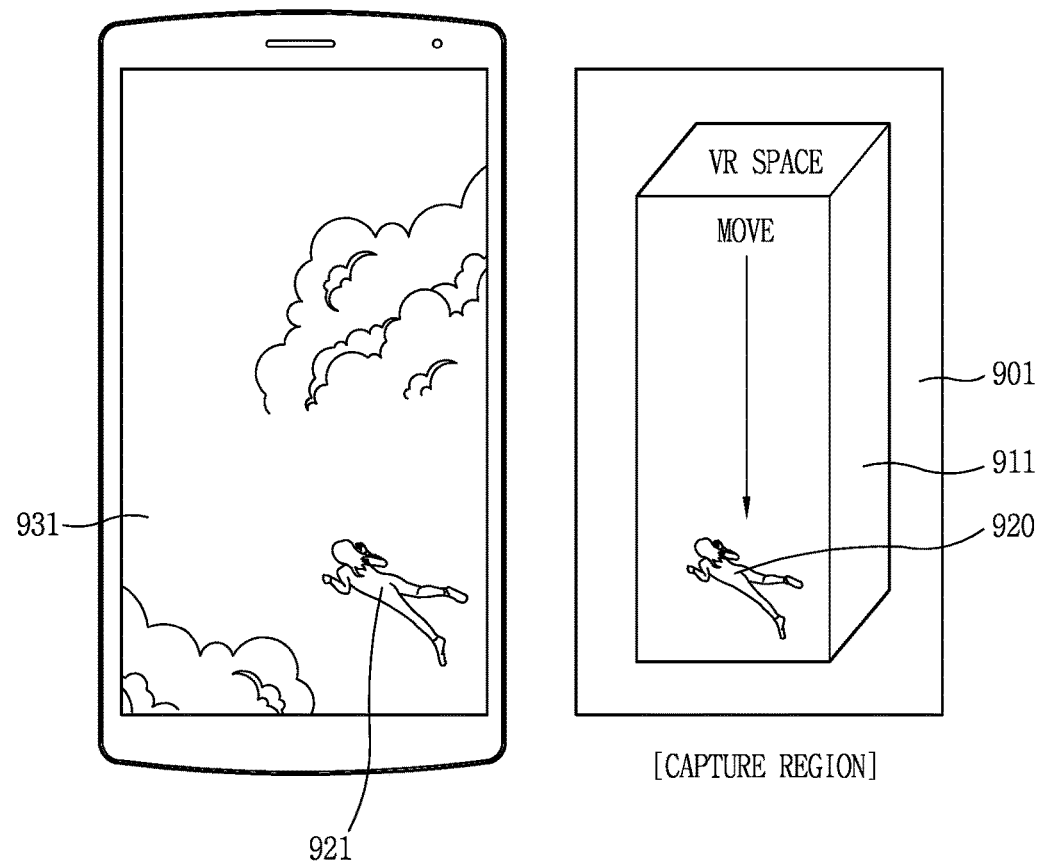
FIGS. 9A, 9B, 9C, 10A, 10B and 10C are exemplary conceptual views illustrating a method of generating and displaying a capture image based on a user's movement range in an electronic device associated with the present disclosure.

For example, as illustrated in FIG. 9A, when skydiving is performed as a virtual experience, the user's own avatar moves rapidly from top to bottom, and thus a virtual avatar 921 included in a capture image 931 is positioned below the center coordinate in consideration of the user's moving direction. In other words, a vertically long 3D rectangular shape extending upward from the current user's position 920 is set to a VR space range 911 to be captured in consideration of a spatial range moved by the user in a virtual space 901. In addition, even when a virtual parachute is deployed or the speed of free fall is slowed down at the time of release of the touch input applied to the virtual icon, a range of the VR space to be captured by tracing back a user activity range for a predetermined previous time may be set in various ways.

Figure 14:
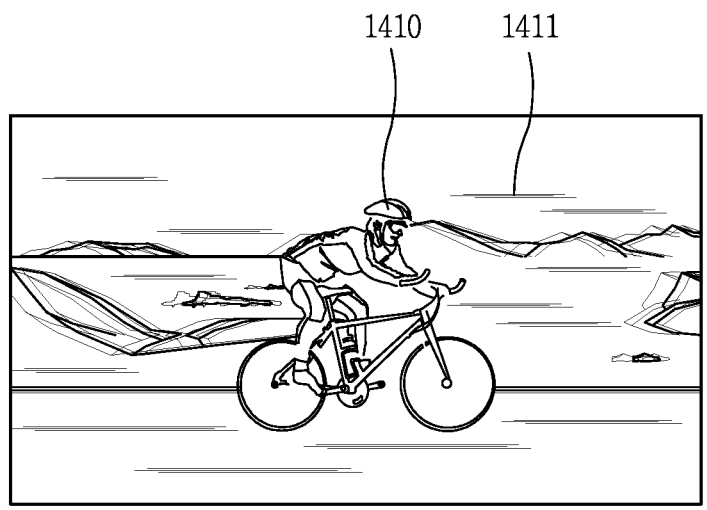
FIG. 14 is a conceptual view illustrating an example in which a degree of user's movement is shown in a capture image in an electronic device associated with the present disclosure.

Furthermore, the visual effect of a panning technique may be displayed on a background image excluding the virtual avatar 921 to show the speed sense of free fall in the capture image 931. For example, as illustrated in FIG. 14, in the capture image, an image of the virtual avatar 1410 can be displayed clearly, but a graphic effect that expresses speed sense calculated based on the movement information of the virtual avatar, namely, a panning technique, can be applied the surrounding background image.

Here, the panning technique refers to a photographing technique in which a moving object is stopped but the background is flowing to make the tone dim, thereby showing the feeling of motion. In a virtual space, no matter how fast the user moves, it is not captured by an optical method of an actual camera, and thus the background image may be clearly displayed as much as he or she likes using the stored 3D data. However, such a photographing technique may be intentionally applied to a capture image, thereby further relating to the user's sense of movement and activity in a virtual space.

Figure 9B:
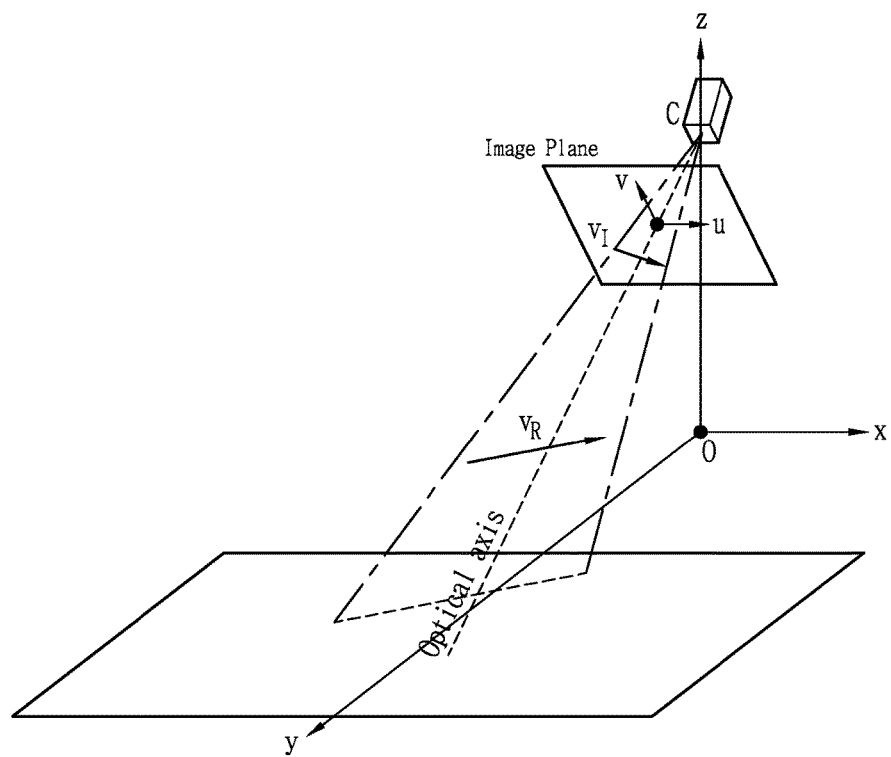

Further, when using the movement information of the virtual avatar (or another moving object) in applying the panning technique, the movement information of an object existing in a virtual space or a velocity of the user himself or herself may be acquired based on the 3D data. In another example, the user's own movement speed can be calculated based on a first still image in the capture image. FIG. 9B is a view illustrating this.

FIG. 9B illustrates an example in which motion generated in a three-dimensional space is projected onto an image plane. As illustrated in the drawing, when a motion vR is generated in a real space, this motion is observed as a motion vector vI on the image plane. According to the proposed method, a virtual optical axis is drawn from vI to estimate a size of vR, thereby calculating a total flow velocity in the image.

In addition, according to an example, when there exist a plurality of virtual avatars, for example, when a plurality of persons perform a skydiving virtual experience at the same time with reference to FIG. 9A, the controller 180 can intentionally remove one or more of his or her own avatar and the other person's avatar from the capture image to generate a three-dimensional image. For this purpose, when a range of the virtual space to be captured is determined, the controller 180 can generate a plurality of capture images in which a plurality of avatars are removed one by one to provide a plurality of virtual avatars included in the capture image in a selectable manner at the time of final storage. Then, some avatars can be intentionally removed based on the user input, and an image of the position where the avatar is removed can be restored by combining the generated plurality of capture images to store only one capture image desired by the user.

Further, a range of the virtual space to be captured is determined based on movement information when the user himself or herself moves in a virtual space in FIG. 9A, but a capture range is set based on the movement information of a moving object when the user has boarded the moving object (e.g., a virtual bird, a virtual airplane, a virtual roller coaster, etc.).

Figure 9C:
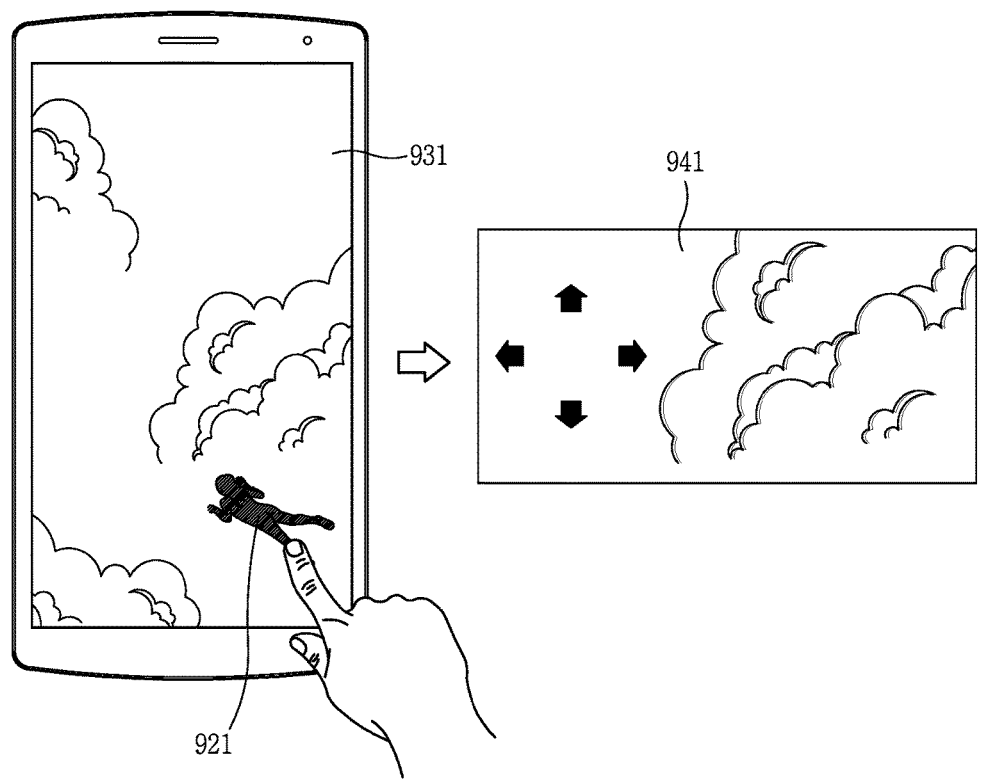

FIG. 9C illustrates an example in which a viewpoint of the capture image is changed by touching a virtual avatar included in the capture image. As illustrated in FIG. 9C, when a capture range of the virtual space is set based on the movement information of a virtual avatar, and when the virtual avatar 921 included in the capture image 931 displayed on the screen is touched, a viewpoint of the capture image is changed to a viewpoint of the virtual space seen by the virtual avatar, namely, a first-person perspective (941). The virtual avatar is not displayed on the capture image 941 whose viewpoint has been changed. Furthermore, a view angle of the 360-degree virtual space from a first-person perspective may be adjusted to a desired direction by using four direction keys displayed on the capture image 941 whose viewpoint has been changed or a touch gesture. When a pinch-in gesture is continuously performed on the capture image 941 whose viewpoint has been changed, the virtual avatar 921 can be displayed while the viewpoint is switched to a third-person perspective as before.

Figure 10A:
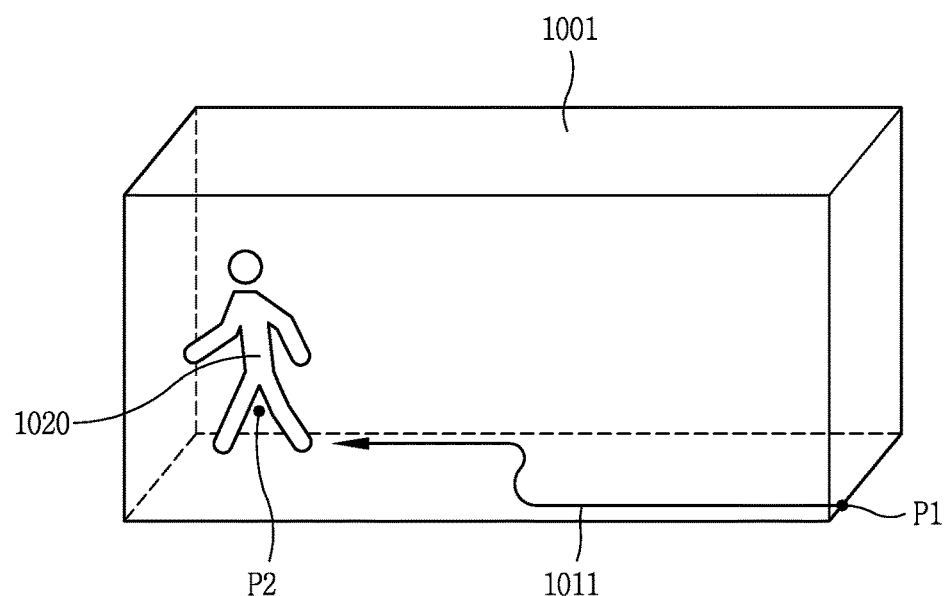
Figure 10B:
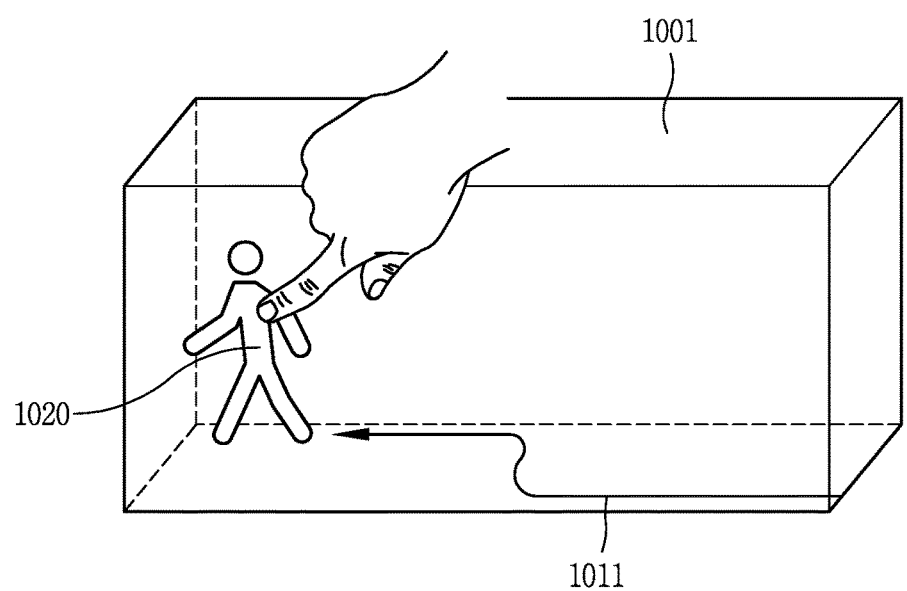
Figure 10C:
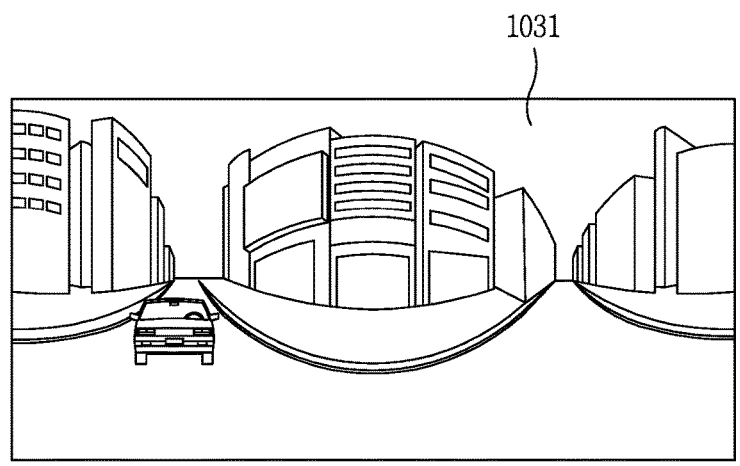

FIGS. 10A, 10B and 10C illustrate an example in which a range of the virtual space to be captured is set based on a user's movement path while a touch input is applied to a virtual icon 610 (FIG. 6A). Here, it is illustrated an example in which the user captures a space in which the user himself or herself is active in a virtual space using a touch input to the foregoing virtual icon. Referring to FIG. 10A, the controller 180 of the electronic device 100 can set the user's position (P1) recognized at the time when a touch input is applied to a virtual icon to one side boundary line of the virtual space to be captured.

Then, the user's position (P2) recognized at the moment of releasing a touch object (e.g., a hand of the user or the virtual avatar) that has applied a touch to the virtual icon is set as the other side boundary line of the virtual space to be captured. Furthermore, a height of a virtual space range to be captured is set in consideration of a height in which the user's virtual avatar 1020 moves in an up-down direction from the position (P1) to the position (P2). In FIG. 10A, a height of a virtual space range to be captured is set based on a height of the virtual avatar 1020 when the user moves on a flat ground. However, when the virtual avatar has jumped or has passed an uphill/downhill road while moving from the position (P1) to the position (P2), the height of the virtual space range to be captured may be set different by adding a distance moved in a vertical direction.

The resultant capture image is generated when a touch applied to the virtual icon is released. In addition, the controller 180 can generate a capture image so a moving path of the virtual avatar is displayed. Accordingly, information 1011 indicating a path the user has moved in the captured virtual space may be displayed on the generated capture image.

For example, as illustrated in FIGS. 10A and 10B, the path can be displayed in the form of a connected line on the bottom of the capture image or expressed in the form of a footprint corresponding to a character of the virtual avatar. Thus, the path that the user has moved is displayed on the capture image, thereby allowing a third person to recognize the user's activity path in a predetermined section with only one capture image.

Furthermore, according to another example, the controller 180 can recognize the user's position (P2) at the time when a subsequent touch input is applied to the virtual icon to finally determine a range of the virtual space to be captured. In this instance, it is not required to continuously apply a touch to the virtual icon while the virtual avatar 1020 moves from the position (P1) to the position (P2).

Furthermore, the capture image including the virtual avatar 1020 is generated, and thus when the virtual avatar 1020 included in the capture image is touched as illustrated in FIG. 10B, an image 1031 in a virtual world viewed from the position (P2) by the virtual avatar 1020 is displayed as illustrated in FIG. 10C. In this instance, the virtual avatar 1020 disappears from the capture image since it is switched from a third person perspective to a first person perspective of the user himself or herself.

In addition, according to another example, the controller 180 can generate a virtual space corresponding to the virtual avatar's movement path and movement range as a capture image based on the virtual avatar's movement path detected within a predetermined time after a touch input applied to the virtual icon is released. For example, even in case where the virtual avatar 1020 is in the position (P1) or a touch applied to the virtual icon is released immediately thereafter in FIG. 10A, when the virtual avatar has moved beyond a threshold distance or above a threshold speed for a predetermined time (e.g., 3-10 seconds), it is possible to generate a capture image including a point (e.g., P2) at which the virtual avatar is located at a moment when a predetermined time has elapsed. According to this, even when the user enters a capture command ahead of an actual capturing time, it is possible to put both the sense of activity and the sense of space of the user into the capture image. Accordingly, the user does not miss a climax impression of VR experience due to entering a capture command.

In the above, examples in which the user intentionally sets a range of a virtual space to be captured based on the extent of the user's own activity or a touch level to the virtual icon have been described. Hereinafter, examples in which a range of the virtual space to be captured is set in consideration of the interest of the other person to be provided with a capture image without allowing the user himself or herself to be centered will be described.

Figure 11A:
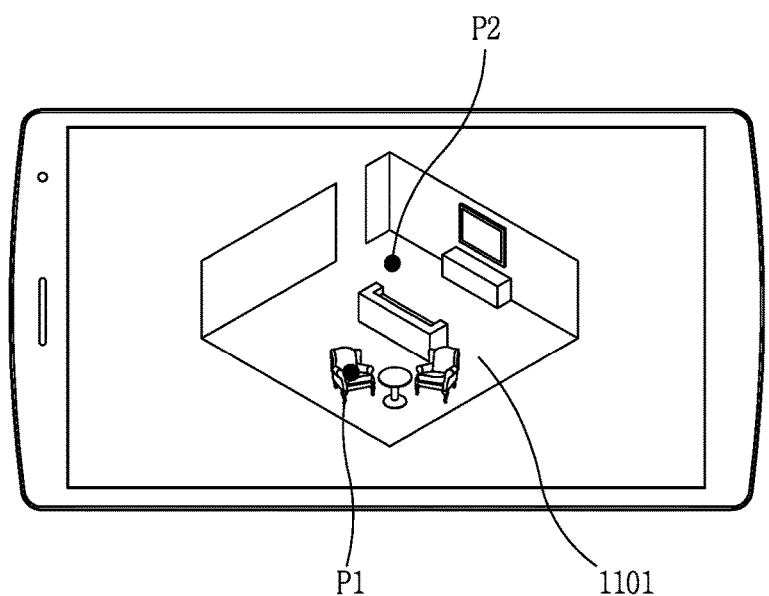
FIGS. 11A, 11B, 11C, 12A, 12B and 12C are exemplary conceptual views illustrating a method for setting a range of a virtual space to be captured in a different manner around a space or an object interacting with a user in an electronic device associated with the present disclosure.
Figure 11B:
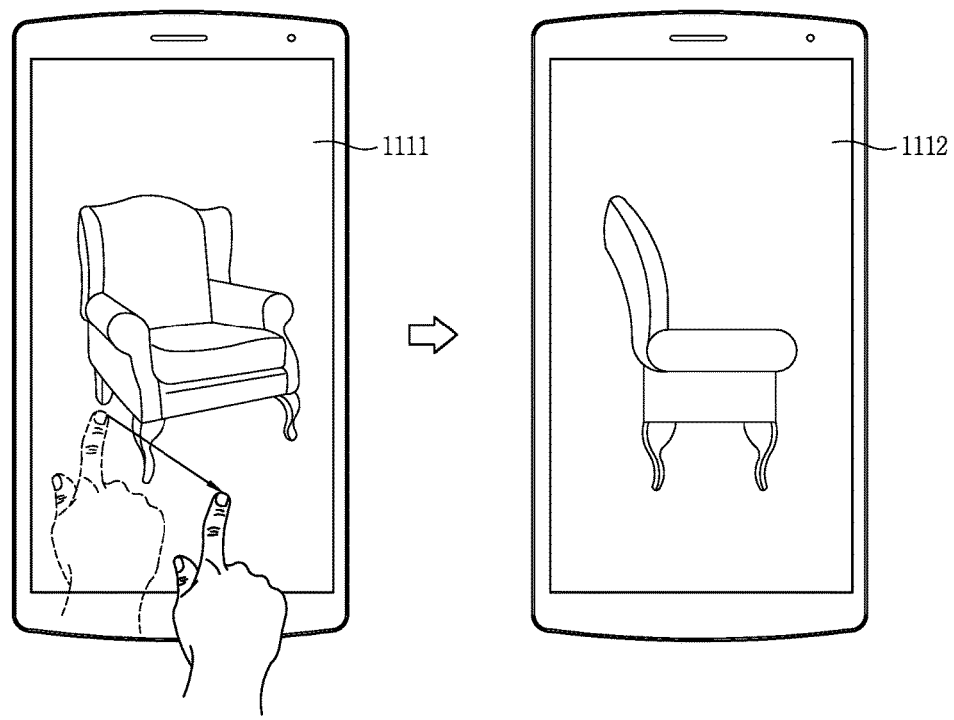
Figure 11C:
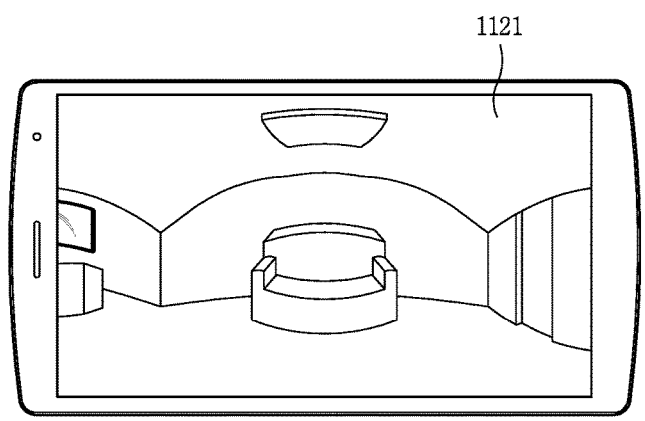

In this regard, FIGS. 11A, 11B, 11C, 12A, 12B and 12C illustrate examples associated with setting a range of the virtual space to be captured around a space or object interacting with a user in a virtual world. First, FIGS. 11A, 11B and 11C are exemplary operations associated with capturing a specific sub-region in a range of the virtual space to provide it to a third person when the virtual space includes a plurality of partitionable sub-regions.

When a virtual world to which a user experiencing VR experience belongs is indoor, it can include a plurality of partitionable sub-regions (or partitions). For example, for a virtual model house, room 1, room 2, bathroom, living room, and the like may be the above-mentioned sub-regions. The sub-regions can be determined based on the existence and size of an object dividing a space such as a wall, a fence, a door, and the like.

FIG. 11A illustrates a capture image generated using a sub-region to which a user belongs. In FIG. 11A, the sub-region to which the user belongs is displayed as a three-dimensional image 1101. For this purpose, when the virtual space includes a plurality of sub-regions, the controller 180 can select one sub-region based on the user's position recognized at the time when a touch input is applied to the virtual icon, and set the entire selected sub-region to a range of the virtual space to be captured.

However, according to another example, a specific space can be selected through a user input, setting or the like to generate it as a capture image even though it is not a sub-region to which the user belongs in a virtual world. For example, even when the user himself or herself may be in room 2 of the virtual model house, it is possible to generate a living room space as a capture image.

When a specific object (P1) included in a three-dimensional image 1101 displayed in FIG. 11A is touched, the selected specific object (e.g., a chair) is enlarged and displayed as illustrated in FIG. 11B. Since the enlarged object image 1111 is also a three-dimensional image, it is possible to rotate the image 1111 through a touch gesture to check the selected object as an image 1112 having another view angle. In addition, a pinch-in/pinch-out touch gesture can be applied to the enlarged object image 1111 to check a reduced or enlarged image of the object.

When a specific point (P2) in a space other than the object is touched in the three-dimensional image 1101 displayed in FIG. 11A, a three-dimensional image 1121 of a sub-region viewed from the corresponding point (P2) as illustrated in FIG. C is displayed. Here, it is also be possible to change the point of looking at the sub-region through a touch gesture such as up, down, left, right or the like, or check a reduced or enlarged image of the sub-region using a pinch-in/pinch-out touch gesture.

The user can perform a specified specific gesture or select a virtual key generated in the enlarged object image 1111 or the three-dimensional image 1121 to return at once to the image 1101 of the entire sub-region illustrated in FIG. 11A.

Furthermore, according to another example, a capture image including a virtual avatar existing in a sub-region may be generated. For a specific example, when a "conference room" or a "meeting room" in a conference is captured as a sub-region, a plurality of virtual avatars performing a conference may be included together in the capture image. In this instance, when a specific avatar is touched on the capture image, a meeting room space viewed by the corresponding avatar may be displayed, thereby feeling the atmosphere of the meeting room that the person has seen.

As described above, a sub-region itself may be provided as a capture image to allow a desired portion of the sub-region to be viewed or enlarged at a desired angle, thereby having an advantage capable of satisfying a variety of different interests of a large number of people sharing the same capture image.

Figure 12A:
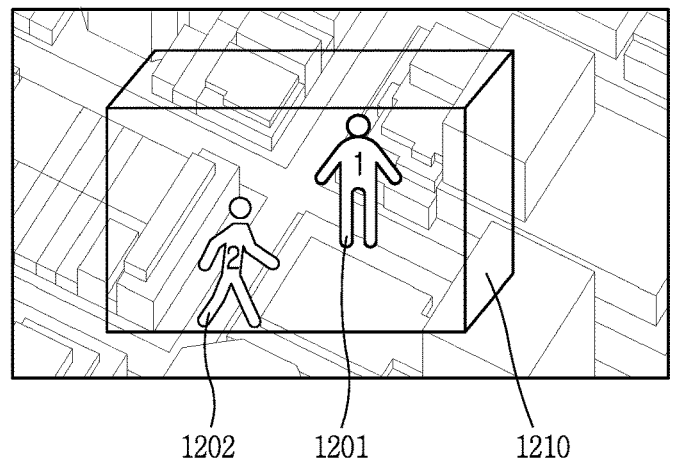
Figure 12B:
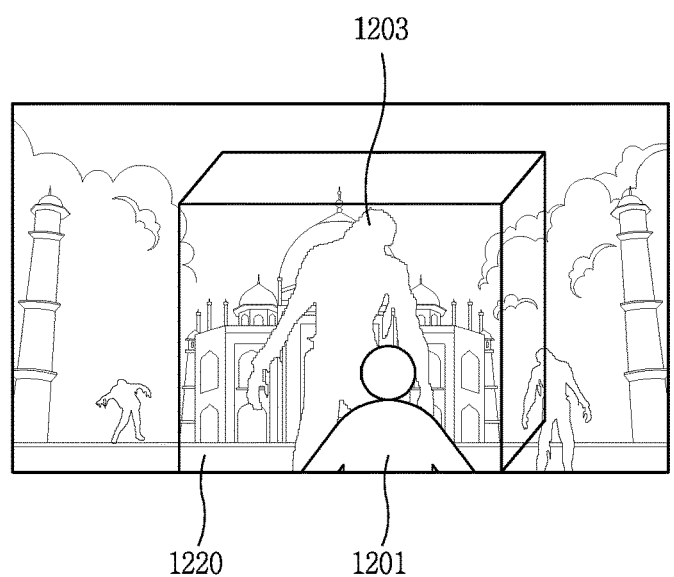
Figure 12C:
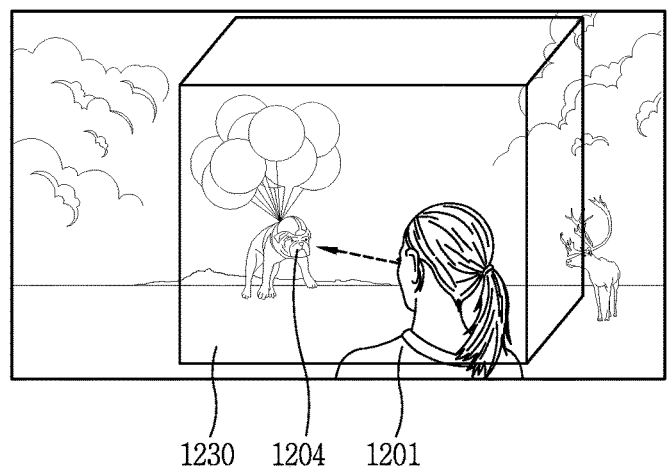

Next, FIGS. 12A, 12B and 12C are examples associated with allowing a user to generate a capture image including an interacting object in a virtual space. Specifically, the controller 180 can set a range of a virtual space to be captured, including a virtual object interacting with an avatar of the user who is experiencing. Here, the virtual object interacting with the virtual avatar includes objects that affect the user himself or herself during a VR experience, affect each other, or are of interest to the user. For example, the virtual object may include a target of the virtual avatar, an avatar of another player who performs a VR experience together with the virtual avatar, an object in which the virtual avatar is interested, and the like.

For example, as illustrated in FIG. 12A, it is possible to set a range 1210 of a virtual space to be captured, including an avatar 1202 of another player who performs a VR experience together as well as an avatar 1201 of the user himself or herself. In addition, when there are a plurality of players who perform a VR experience together, it may be possible to add a human condition such as a player who is currently chatting, a player of the same team, or a number of players located close to the user's current position to limit a range of the virtual space to be captured.

In another example, as illustrated in FIG. 12B, a capture range 1220 can be set including an enemy or target 1203 that the user's own avatar 1201 is currently fighting. In this instance, a capture image can be generated so a view from a third-person perspective together with a coordinate of the avatar 1201 and a coordinate of the enemy or target 1203 form triangular vertices to exhibit a confrontation between the avatar 1201 and the enemy or target 1203 in a capture image.

In another example, as illustrated in FIG. 12C, the user himself or herself 1201 can set a capture range 1230 including an object 1204 looked at with interest during a VR experience. Thus, when the user's gaze is fixed to a specific object for more than a reference period of time during a VR experience, the specific object to which the gaze is fixed may be implemented to perform a predetermined reaction (e.g., sound, movement, etc.). Then, at the moment when a touch input applied to the virtual icon is released, a capture image including an avatar of the user himself or herself and the corresponding object is generated.

Further, when a touch input is applied to a virtual icon for generating a capture image, a graphic object indicating a virtual object to be included in the capture image may be displayed. For example, as described above, it is possible to recognize that a user is captured together by allowing a virtual object to make a specific response or changing an image of a virtual object (e.g., color change, visual effect output to a frame, etc.).

In addition, when a touch input is applied to the graphic object displayed on the virtual object within a reference period of time, a range of the virtual space to be captured is changed. For example, the virtual object to which the touch input is applied can be removed to set a capture range. Then, the capture image will not include the virtual object.

Figure 13:
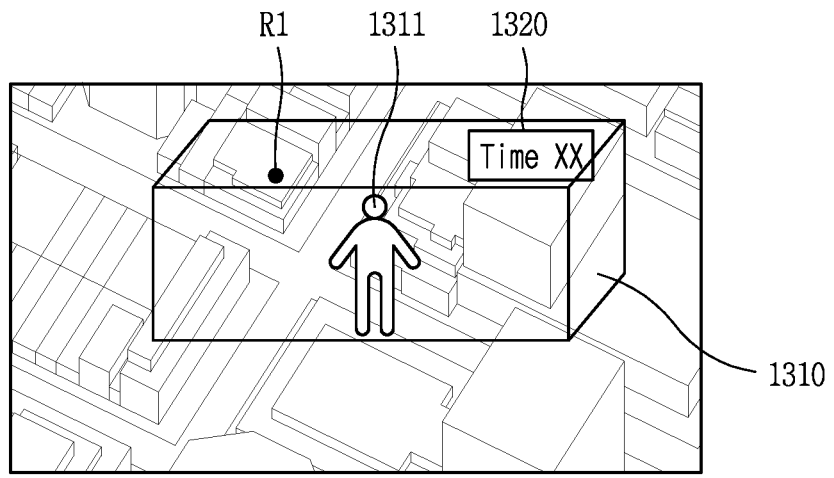
FIG. 13 is an exemplary conceptual view for setting a range of a virtual space to be captured based on a set time range in an electronic device associated with the present disclosure.

Next, FIG. 13 illustrates an example in which a virtual space is zoomed out based on a specific time range to generate a capture image in an electronic device associated with the present disclosure. For this purpose, prior to generating a capture image, time information may be received through the user input units 123a, 123b, 123c in the electronic device 100 or a user input unit of the terminal device 200 electrically connected to the electronic device 100. For example, from 10 a.m. to 2 p.m. may be entered as time information. The entered time information is stored in the memory 170 or the like.

Next, the controller 180 generates a capture image (hereinafter, referred to as "first capture image") of the virtual space corresponding to a touch level of the touch input applied to the virtual icon. Then, at the moment when a time corresponding to the entered time information has elapsed, a capture image (hereinafter, referred to as a "second capture image") of the virtual space in which the user travels for a period of time corresponding to the entered time information is generated. Assuming that the user moves within the virtual space, the second capture image becomes an upper spatial image or zoom-out image of the first capture image.

FIG. 13 illustrates a range 1310 of a virtual space corresponding to the second capture image around a current position of the avatar 1311. In the second capture image, time information 1320 corresponding to a capture range may be displayed. When there is a capture image, namely, the first capture image, generated during the displayed time, a user position (R1) corresponding to the first capture image may be displayed on the second capture image.

In addition, according to an example, the set time information can be changed to change a capture range in a different manner. Assuming that the longer the set time range the more the user travels, a visual effect such as screen zoom-in or screen zoom-out can actually be applied to the capture image. Alternatively, according to another example, a virtual space can be captured for each specific time zone to generate a plurality of capture images, and connect the generated capture images so as to store and track the moving path of the avatar.

FIGS. 15A, 15B, 15C and 15D are examples associated with differently generating an initial view of a capture image using a user's gaze. In other words, the capture image according to the present disclosure can allow a change of the check, enlargement, reduction, and viewpoint of the 360-degree view angle, how to set an initial viewing of the capture image is not so important. However, in some cases, the user may want to emphasize what he or she has viewed during a VR experience as shown in his eyes.

In a real environment, when an object near the user's position is viewed, the vicinity of the relevant object is not well seen, and when viewing an object farther away, the vicinity of the object comes into view more widely. Similarly, even for a lens, it exhibits an out-focusing effect in which a peripheral portion is blurred when a subject is close to the lens, and a pan-focusing effect in which the background and the subject are both clearly photographed as the subject moves away. Since a VR space generates a capture image using three-dimensional data, a capture image can be generated by sharpening the object and the background regardless of whether an object viewed by the user is close to or far from the user's position. However, when the user wants to emphasize what he or she has seen during a VR experience as shown in his or her eyes, effects similar to the out-focusing and pan-focusing techniques described above may be applied to the capture image.

Figure 15A:
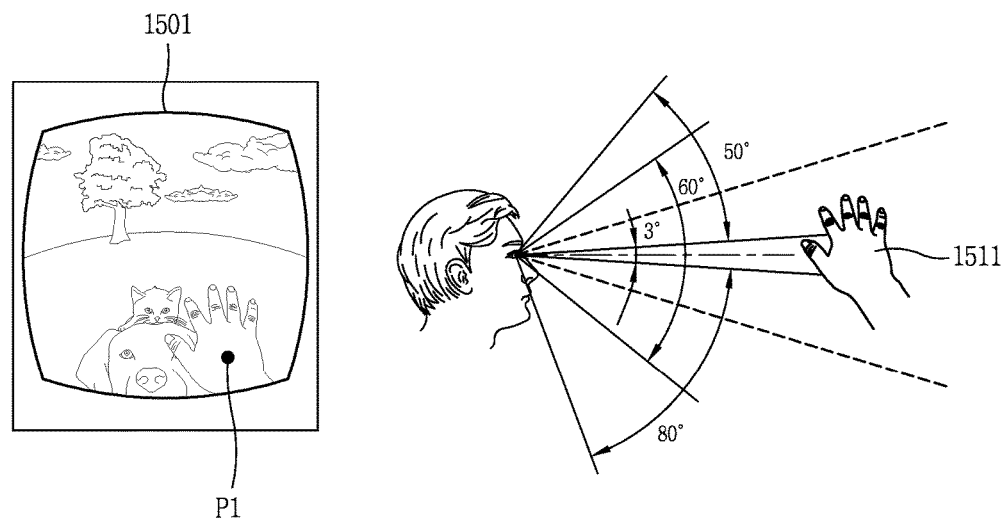
FIGS. 15A, 15B, 15C and 15D are conceptual views illustrating an example in which a capture image is generated using a user's gaze in an electronic device associated with the present disclosure.
Figure 15B:
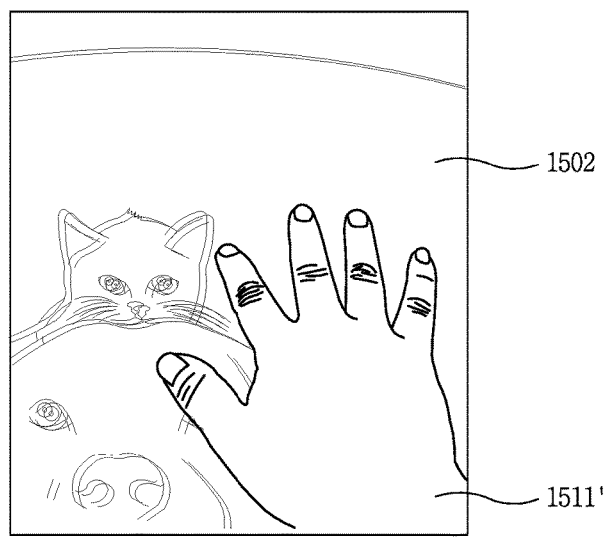

First, referring to FIG. 15A, an out-focusing effect can be applied to a capture image when it is captured while the user views a hand (P1) near the user's position in a three-dimensional image 1501 in a virtual world. Thus, a degree of blur is strongly set such that a hand shape 1511 is filled at the center line of the user's gaze, and the background around the hand shape is blurred. Accordingly, as illustrated in FIG. 15B, an initial viewing of the capture image exhibits an out-focusing phenomenon in which the object (hand) viewed by the user is filled on the screen and the periphery thereof is graphically processed in a blurred manner.

Figure 15C:
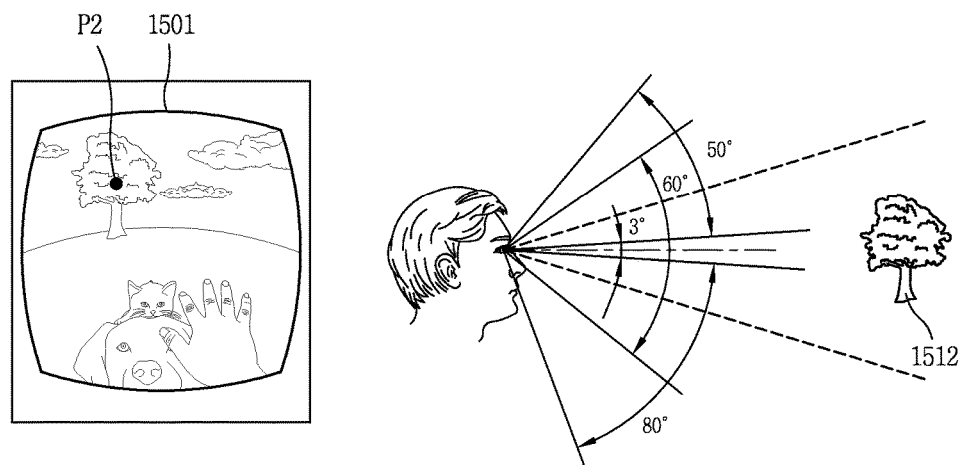
Figure 15D:
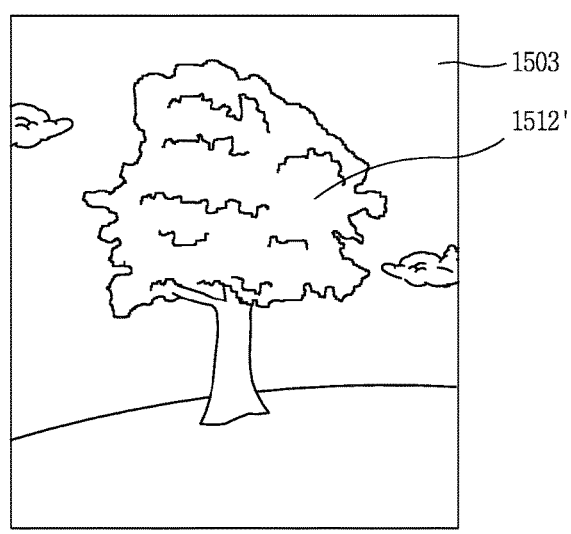

Referring to FIG. 15C, when a capture image is captured while looking at a tree (P2) far from the user's position in the three-dimensional image 1501 in a virtual world, a pan-focusing effect can be applied to the capture image. Specifically, the center line of the user's gaze includes not only a tree shape 1512 but also other objects in the vicinity thereof, and a degree of blur is slightly set such that the background distant from the center line is slightly blurred or in a similar manner. As a result, as illustrated in FIG. 15D, an initial viewing of the capture image exhibits a pan-focusing in which both the object (tree) and the surrounding background come into the screen, and the background around the tree is graphically processed in a clear manner.

Figure 16A:
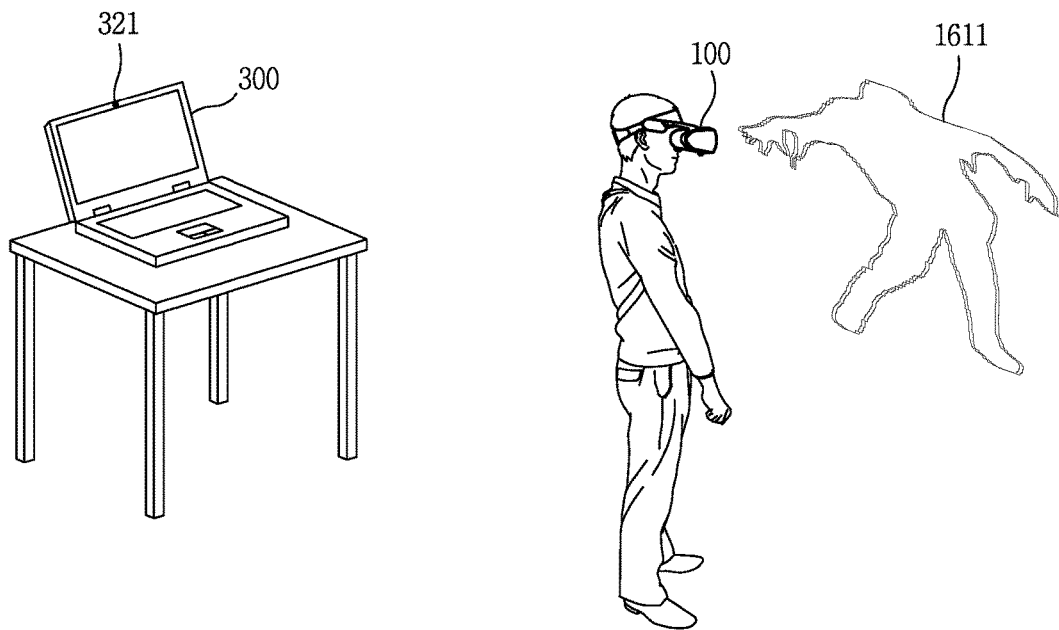
FIGS. 16A, 16B, 16C, 16D, 17A, 17B, 17C and 17D are conceptual views illustrating examples associated with generating a capture image of a virtual space using an external camera in an electronic device associated with the present disclosure.

Next, FIGS. 16A, 16B, 16C, 16D, 17A, 17B, 17C and 17D are examples associated with generating a capture image of a virtual space using an external camera. FIG. 16A illustrates a case where the electronic device 100 is electrically connected to the external terminal 300 to receive virtual reality content from the external terminal 300. It is assumed that a user wearing the electronic device 100 turns his or her back on the external terminal 300 to fight with a virtual enemy 1611. In addition, in order to generate a capture image using the camera 321 of the external terminal 300 such that a face of the user's virtual avatar appears, the position of the user's reality should be changed.

Figure 16B:
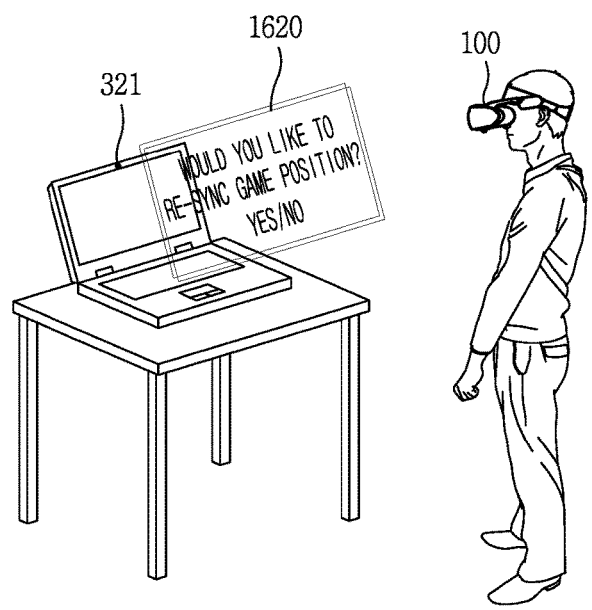

Accordingly, when a playback of the virtual reality content is stopped to change the position of the user's reality, all the virtual enemies 1611 disappear. Thereafter, the user holds an appropriate photographing position play the virtual reality content back again. In addition, it is recognized that the user's reality position has been changed to ask whether a game position is changed to an actual position, namely, whether re-sync is performed based on a current position, prior to restarting the VR game again as illustrated in FIG. 16B (1620). Alternatively, according to another example, when the position or posture is changed after the user stops the playback of the content, re-sync may be automatically performed based on a current position for a predetermined period of time.

Figure 16C:
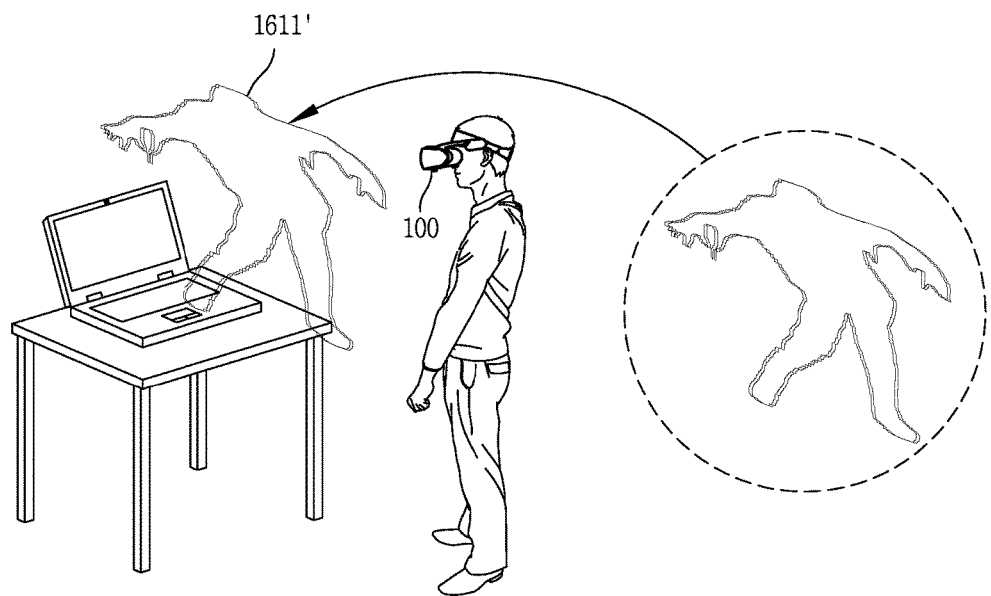
Figure 16D:
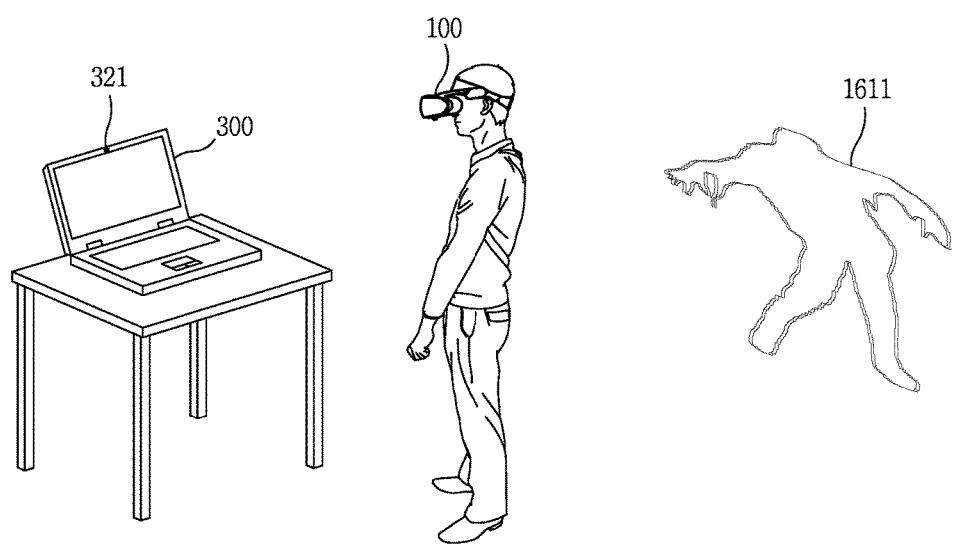

When the user responds "Yes" to the re-sync request, the position of the game space is modified to match the changed user's current position. Accordingly, the position of the virtual enemy 1611' also appears before the changed user's current position as illustrated in FIG. 16C. On the contrary, when the user responds "No" to the re-sync request, the changed reality is not reflected to play the game according to the user's position prior to the stop of the play. As a result, as illustrated in FIG. 16D, the user stands in a direction opposite to the cam 321 of the external terminal 300, and the virtual enemy 1611 appears behind the user's back based on the previous user's position.

In another example, FIGS. 17A through 17D illustrate a series of operations in which a third person captures a user in a virtual world from a third-person perspective with another terminal device. Here, it is assumed that the electronic device 100 and the terminal device of the third person perform wireless communication with each other. It is also assumed that the user wearing the electronic device 100 is set to allow photographing a virtual world experienced by himself or herself from the outside.

Figure 17A:
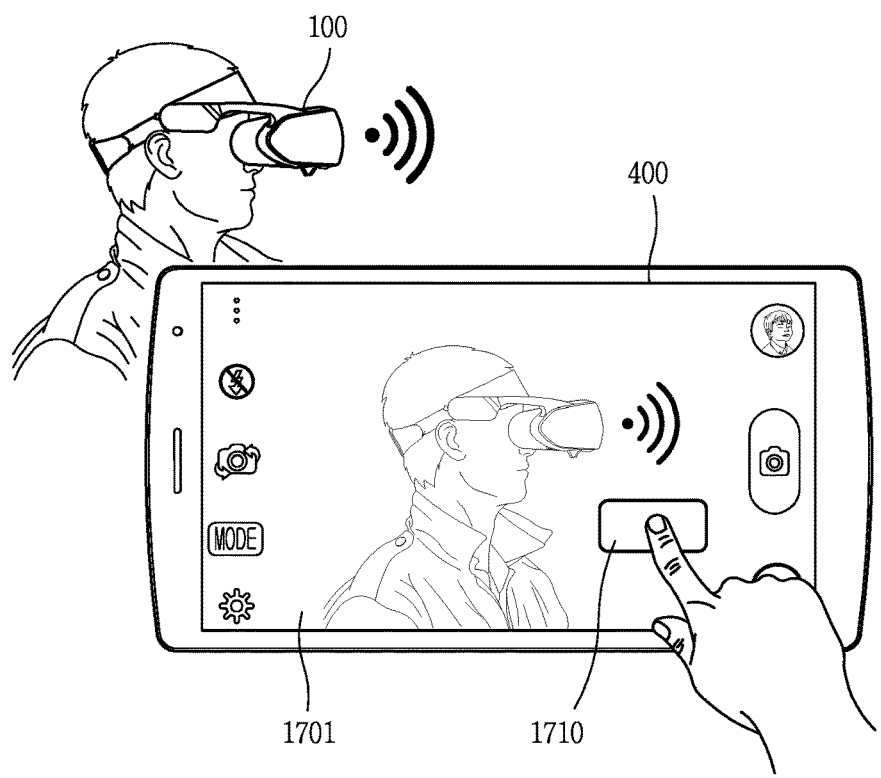
Figure 17B:
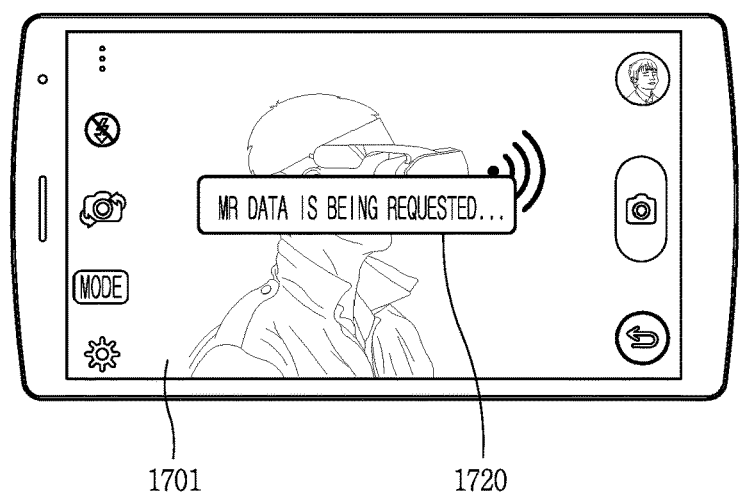

In this instance, being when the electronic device 100 can transmit a virtual space to an electronic device in the vicinity of the electronic device 100, for example, a terminal device of a third person can be broadcast or advertised through BLE or the like at a predetermined cycle. In addition, as illustrated in FIG. 17A, as a camera application is executed in the terminal device 400 responding to a BLE signal, when a preview screen 1701 is displayed, a virtual key 1710 for executing a mixed reality (MR) image view is generated on the relevant preview screen 1701.

When the third person selects the relevant key 1710, a message (e.g., a guidance prompt, a notification icon, etc.) indicating that the third person desires to photograph himself or herself is generated to the user wearing the electronic device 100. In addition, the message includes information associated with a third person. While the user wearing the electronic device 100 responds, an indicator 1720 indicating that a MR data is being requested is displayed on the preview screen 1701.

Figure 17C:
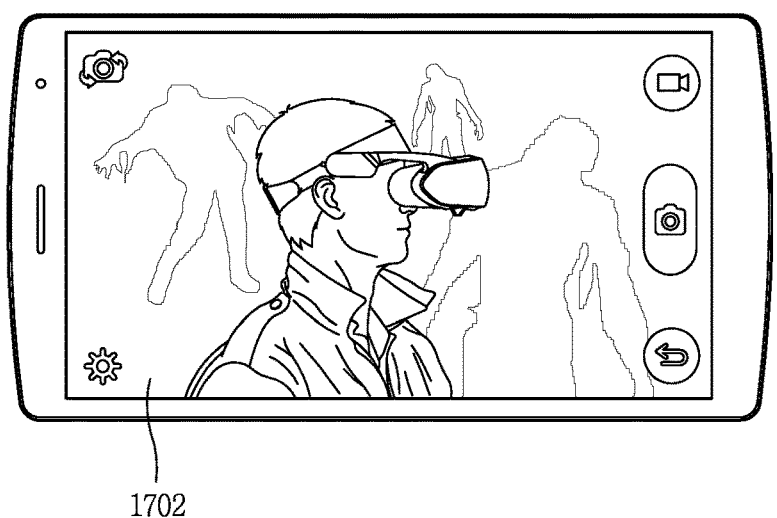

When the user wearing the electronic device 100 accepts photographing, an MR preview screen 1720 synthesized with virtual 3D data is displayed as illustrated in FIG. 17C. At the same time, though not shown in the drawing, the user wearing the electronic device 100, is informed of who is photographing his or her virtual world, i.e., information on the user of the terminal device 400 (e.g., "Tom is photographing").

Figure 17D:
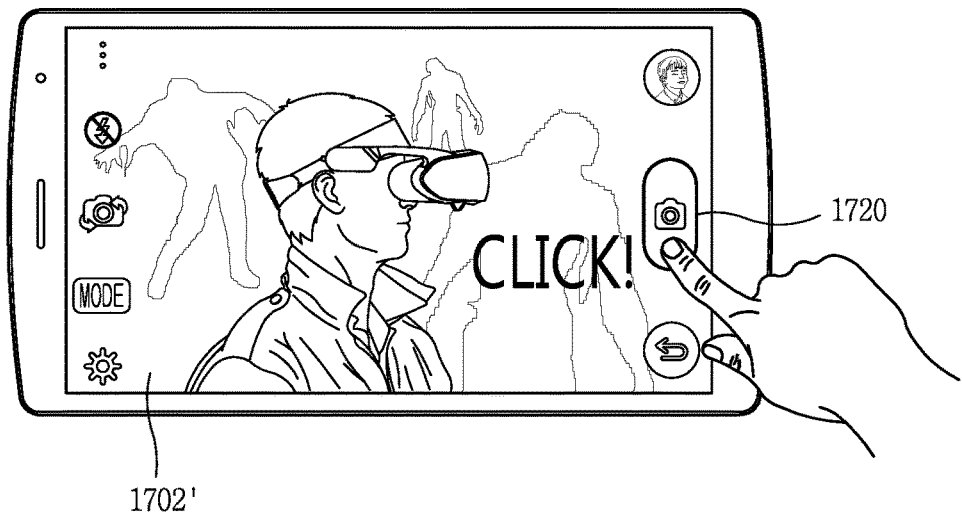

Then, when a third person touches a photograph button 1720 as illustrated in FIG. 17D, a capture image in which the user wearing the electronic device 100 is mixed with a virtual world and reality is generated. The generated capture image is also transmitted to the user wearing the electronic device 100, and appears in virtual reality.

In addition, the capture image is stored at the same time in the electronic device 100 as well as the terminal device 400 of the third person. In addition, the electronic device 100 may also store a view image from a first-person perspective viewed by the user wearing the electronic device 100 at the time of generating the capture image.

Further, when the user wearing the electronic device 100 views a capture image stored through a gallery or the like, detailed information associated with the capture image is displayed. The detailed information may include additional information associated with the characteristics of mixed reality (MR), such as position information of a virtual world, information of a third person to be photographed, load information, and the like. In addition, when the position information of the virtual world is selected, the user can directly enter a virtual world at the position.

As described above, an electronic device according to an embodiment of the present disclosure can intentionally generate a capture image with a wider space range including a user himself or herself even when a virtual space is captured from a first-person perspective. Furthermore, a capture image of a first-person perspective can be changed to a third-person perspective or a capture image of a third-person perspective can be changed to a first-person perspective, thereby checking a virtual world from a desired viewpoint and view angle. In addition, various visual effects can be applied to a capture image in consideration of activities such as user's motion in a virtual world, fixation of gaze, and the like, thereby obtaining a capture image almost the same as that seen by the user in the virtual world.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). The computer may include the controller 180 of the mobile terminal 100. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An electronic device, comprising: a display; and a controller configured to:
   display a playback screen of virtual reality content on the display,
   in response to a capture command while displaying the playback screen of the virtual reality content, display a virtual icon on the playback screen, and
   in response to a touch input applied to the virtual icon, capture an image of a virtual space of the virtual reality content based on a position of a user in the virtual space and corresponding to a touch level of the touch input,
   wherein the captured image comprises a user's virtual avatar in the virtual space, and wherein when the touch input is applied to the virtual icon, the controller detects movement information of the virtual avatar, and sets a range of the virtual space to be captured based on the movement information.

2. The electronic device of claim 1, wherein in response to the touch input applied to the virtual icon being released, the controller is further configured to determine the range of the virtual space to be captured.

3. The electronic device of claim 2, wherein the controller is further configured to vary the range of the virtual space to be captured in response to a varying touch level of the touch input applied to the virtual icon.

4. The electronic device of claim 3, wherein the controller is further configured to display a graphic object corresponding to the range of the virtual space to be captured on the virtual icon.

5. The electronic device of claim 4, wherein the controller is further configured change an image of the graphic object to correspond to the range of the virtual space.

6. The electronic device of claim 1, wherein the movement information comprises a movement path and movement range of the virtual avatar, and
   wherein the controller is further configured to determine whether the movement range of the virtual avatar within a predetermined time subsequent to releasing the touch input exceeds a predetermined range, and capture the image of the virtual space corresponding to the movement path and movement range of the virtual avatar according to the determination.

7. The electronic device of claim 1, wherein the controller is further configured to display a graphic image indicating the range of the virtual space calculated based on the movement information adjacent to the virtual avatar.

8. The electronic device of claim 1, wherein in response to a touch applied to the virtual avatar, convert a capture image at a first viewpoint in which the virtual avatar is viewed by a third person into a capture image at a second viewpoint viewed by the virtual avatar.

9. The electronic device of claim 1, wherein in response to a touch applied to a virtual object included in the captured image, the controller is further configured to display an enlarged image of the virtual object, and change a view angle of the virtual object based on a drag touch input applied to the enlarged image.

10. The electronic device of claim 1, wherein a viewpoint of the capture image corresponds to a viewpoint at which the user views the virtual space in all directions, and
    wherein the controller is further configured to change and display a view angle of the captured image while maintaining the viewpoint of the capture image based on a first touch gesture applied to the displayed image.

11. The electronic device of claim 10, wherein the controller is further configured to:
    display the captured image in which the viewpoint is changed while the capture image is zoomed out based on a second touch gesture applied to the displayed image, and
    display the virtual avatar on the capture image in which the viewpoint is changed.

12. The electronic device of claim 1, wherein the virtual space includes a plurality of sub-regions, and
    wherein the controller is further configured to set a sub-region selected based on the position recognized at the time when the touch input is applied to the virtual icon as a range of the virtual space to be captured.

13. The electronic device of claim 1, wherein the controller is further configured a set the range of the virtual space to be captured by including a virtual object interacting with the virtual avatar.

14. The electronic device of claim 13, wherein in response to the touch input applied to the virtual icon, the controller is further configured to display a graphic object indicating the virtual object to be included in the capture image, and
    change the range of the virtual space to be captured based on an input applied to the graphic object within a reference time.

15. The electronic device of claim 1, wherein the controller is further configured to:
    capture a first image of the virtual space based on the position of the user,
    capture a second image including the virtual space in which the user travels for a period of time included in received time information, and
    display the position of the user in the first image in the second image.

16. A method of controlling an electronic device, the method comprising:
    displaying a playback screen of virtual reality content on a display of the electronic device;
    in response to a capture command while displaying the playback screen of the virtual reality content, displaying a virtual icon on the playback screen; and
    in response to a touch input applied to the virtual icon, capturing, via a controller, an image of a virtual space of the virtual reality content based on a position of a user in the virtual space and corresponding to a touch level of the touch input,
    wherein the captured image comprises a user's virtual avatar in the virtual space, and
    wherein the method further comprises:
    detecting movement information of the virtual avatar when the touch input is applied to the virtual icon; and
    setting a range of the virtual space to be captured in a different manner based on the movement information.

* * * * *